United States Patent [19]
Read et al.

[11] Patent Number: 5,090,479
[45] Date of Patent: Feb. 25, 1992

[54] METHOD FOR SCALE INHIBITION IN OIL PRODUCING WELLS

[75] Inventors: Peter A. Read, Sola; Terje Schmidt, Sandnes, both of Norway

[73] Assignee: Den Norske Stats Oljeselskap A.S., Stavanger, Norway

[21] Appl. No.: 545,712

[22] Filed: Jun. 29, 1990

[51] Int. Cl.$^5$ .................... E21B 43/12; E21B 43/22
[52] U.S. Cl. .................... 166/279; 166/300
[58] Field of Search ............ 166/279, 300, 305.1; 252/8.552

[56] References Cited

U.S. PATENT DOCUMENTS

| | | | |
|---|---|---|---|
| 3,633,672 | 1/1972 | Smith et al. | 166/279 |
| 3,704,750 | 12/1972 | Miles et al. | 166/279 |
| 4,357,248 | 11/1982 | Berkshire et al. | 166/279 X |
| 4,393,938 | 7/1983 | Lawson et al. | 166/279 |
| 4,779,679 | 10/1988 | Snavely, Jr. et al. | 166/902 X |
| 4,787,455 | 11/1988 | Snavely, Jr. et al. | 166/279 |
| 4,860,829 | 8/1989 | Carlberg et al. | 166/902 X |

OTHER PUBLICATIONS

T. G. Braga, "Effects of Commonly Used Oilfield Chemicals on the Rate of Oxygen Scavenging by Sulfite/Bisulfite", SPE Production Engineering, May 1987, pp. 137–142.
A. A. Hamouda, "Water Injection Quality in Ekofisk-UV Sterilization And Monitoring Techniques", UK Corrosion '90, 29–31 Oct. 1990, vol. 1, pp. 1-95-1-129.
"Snorre Water Injection Applies New Treatment Technology", Ocean Industry, Dec. 1990/Jan. 1991, pp. 22–25.
Hensel Jr., et al., "Understanding and Solving Injection Well Problems", Petroleum Engineer International, May 1981, pp. 155–170.
R. W. Mitchell, "The Forties Field Sea-Water Injection System", Journal of Petroleum Technology, Jun. 1978, pp. 877–884.
R. W. Mitchell, "*Water Quality Aspects of North Sea Injection Water*", Journal of Petroleum Technology, Jun. 1981, pp. 1141–1152.
E. S. Snavely, Jr., "*Chemical Removal of Oxygen from Natural Waters*", Journal of Petroleum Technology, Apr. 1971, pp. 443–446.

*Primary Examiner*—George A. Suchfield
*Attorney, Agent, or Firm*—Foley & Lardner

[57] ABSTRACT

A method for inhibiting scale formation in oil producing wells. The method comprises pretreating the rock formation of the near well bore area with a surface agent and then a saline solution by injecting these down the well bore. Subsequently the formation is treated with a source of divalent cations such as calcium. An acid inhibitor in the form of a polyacrylic acid derivative, a phosphonated or a phosphinopolycarboxylic acid is then injected into the rock formation and allowed to soak in for a period of 24 hours. The inhibitor is retained on the surface area of the rock formation by means of divalent cationic bonds.

15 Claims, 23 Drawing Sheets

METHOD FOR SCALE INHIBITION IN OIL PRODUCING WELLS

BACKGROUND OF THE INVENTION

The present invention relates to scale inhibition in oil producing wells, in particular but not exclusively, submarine wells.

The formation of scale is a well known problem in oil production. As liquid is extracted from oil-bearing formations, mineral deposition occurs, principally sulphates and carbonates, particularly in the near-wellbore zone where higher liquid fluxes are experienced and also in the production equipment. Deposition of this scale occurs for a number of reasons, among which are pressure reduction, which affects various chemical equilibria, and the possible chemical incompatibility of the formation water and the water (usually treated seawater) pumped into the formations to replace the extracted material.

Scaling is usually combated using an inhibitor "squeeze", in which a material which inhibits the formation of scale is injected into the well-bore area via the production well. This means that production must be halted while the squeeze operation is carried out, which may take 24 to 48 hours. The costs involved, including the operation cost and lost production, may represent over 50,000 per squeeze, and each treatment tends to provide effective inhibition for about 6 months.

OBJECTS AND SUMMARY OF THE INVENTION

It is an object of the present invention to provide a treatment method that would inhibit scale formation for a longer period.

In general, when the inhibitor is injected, about one third is lost in and through the rock formations, about one third is in free solution and so washes out when production is restarted and about one third remains. This remaining portion is adsorbed by the rock formations and is released over a period of time along with the well fluids, thus inhibiting scaling. Initially, the concentration of inhibitor will be too high and subsequently, the concentration of released inhibitor falls exponentially. In practice, therefore, far more inhibitor must be used than is absolutely necessary and its concentration is rarely at the optimum value.

It is a further object of the present invention to provide a treatment method which results in a more even release of inhibitor over the protection period, while also minimising waste.

According to the invention, there is provided a method of treating a fluid-bearing rock formation to inhibit the deposition of scale, which comprises treating the formation with a source of divalent alkali earth metal cations which displace a proportion of the cations from the surface area of the material of the formation, and subsequently treating the formation with an inhibitor. In this way, the inhibitor molecules form chemical bonds with the substituted cations, allowing far more inhibitor to be retained. This tends to be released over a longer period since the release rate now depends on both dissolution and desorption. The amount released may be dependent upon the composition of the formation liquid, and the concentration over the effective period may show a less marked decay.

Preferably, the alkali earth metal is added in the form of an aqueous solution of a salt of the metal, such as the chloride. Preferably the metal is calcium. Preferably, the formation is treated sufficiently to saturate the ion-exchange sites. Treatment time may vary from 6 hours to 72 hours, preferably 12 hours to 36 hours, for example 24 hours, and the concentration of the metal may vary from 400 mg/l to 30,000 mg/l, preferably 1500 mg/l to 3000 mg/l, for example 2500 mg/l. Conveniently the treatment liquid may be a natural water source, such as sea water, which has been de-aerated and rendered biologically inert and to which calcium chloride has been added.

The inhibitor may be any convenient acidic material which has a scale inhibiting effect, i.e. any known acid inhibitor. Examples are phosphonates and polycarboxylic acids, polyacrylic acids, maleic acid derivatives and co-polymerised maleic acid anhydride.

Preferred inhibitors include acrylic acid derivatives, phosphates and phosphate esters, in particular, phosphonates and phosphinopolycarboxylic acid (PPCA). Treatment time with the inhibitor may vary from 6 hours to 72 hours, preferably 12 hours to 36 hours for example 24 hours, and the concentration of the inhibitor may vary from 10,000 mg/l to 50,000 mg/l, preferably 30,000 mg/l. The inhibitor is then allowed a soak period of from 6 hours to 48 hours, preferably about 12 hours to 24 hours, for example about 16 hours.

When the formation is treated with the acid inhibitor after the calcium cation treatment, it is believed that a salt of the acid and the $Ca^{++}$ ions is formed at each cation site. Thus, the inhibitor molecules are chemically attached to the formation rock. However, the solubility of the salt is low and so the rate of inhibitor release is reduced and consequently, more can be retained.

A further advantage, particularly when the preferred PPCA is used, arises from the fact that the redissolved salt has a fairly narrow molecular weight range, certainly narrower than the range of the PPCA. The particular range caused to be selected by the reaction appears to be more efficient in the inhibition role when the inhibitor is released back into solution.

The acid inhibitors employed may be very strongly acidic, for example, phosphonates may have a pH of 1.5 to 2. This may be highly undesirable if the rock strata under treatment are loose formations held together by calcite or siderite or some other mineral susceptible to acid attack. While it is possible to partly neutralize the acid for example with NaOH or some other alkali or a buffer system which is able to raise the pH of the inhibiter to between 5.0 and 6.0, it is preferred to use an exhibiter system having a pH of perhaps 5.5 or 5.0, or whatever value is necessary to match more closely the formation water. This also makes handling easier and reduces the danger of corrosion of oil wells and surface equipment.

Prior to the cation and inhibitor treatments, the rocks in the near well bore area may be subjected to some pre-conditioning. Preferably, the formations first receive a pre-flush of an aqueous solution of a surface-active agent to remove any oil and to render the rock surface intrinsically water "wet". This pre-flush may take from 6 hours to about 72 hours.

Suitable surface active agents include sulphonates, phenylethoxylates and alcohol esters, the preferred being ethylene propylene oxide copolymers, particularly the amin-based ethylene propylene oxide copolymers. These may be used in concentrations of 1000 mg/l to 50,000 mg/l, 10,000 being preferred.

Following the pre-flushes (surfactant and calcium solution), the rocks may be subjected to a spacer of saline (KCl) solution together with various other salts. The purpose of this is to prevent premature contact between the inhibitor and the following solutions and to stabilize clay minerals. The concentration of the KCl may be from 400 mg/l to 50,000 mg/l, preferably about 20,000 mg/l.

After these three pre-treatments, the rock formation may be subjected to the inhibitor injection. Following the injection of the inhibitor, a spacer of saline (KCl) solution may be injected. The concentration of the KCl may be from 400 mg/l to 50,000 mg/l preferably 20,000 mg/l.

Following this KCl spacer, a solution of calcium ion containing water having a concentration of 400 mg/l to 30,000 mg/l, preferably, 2,500 mg/l, may be injected to displace the inhibitor solution out to a radius of 2 m to 7 m, preferably about 5 m. The purpose of this after flush is to enhance further the retention of the inhibitor within the reservoir rock.

After the soak period, the well can be put back on production, allowing the excess fluid to be displaced. As the well regains normal fluid flow, the more strongly-bound inhibitor is very slowly re-dissolved in the scale forming waters, and scale deposition is inhibited.

Current indications are that with the present invention, less inhibitor is returned on start-up, as much as three times as much may be retained in position, and no apparent difficulties are experienced particularly in process equipment.

EXPERIMENTAL RESULTS

In order to support and verify the foregoing, various experiments have been conducted, and will now be described.

The adsorption of a scale inhibitor from solution can be described by the Freundlich isotherm (10)

$$C_s = kC^n \quad 0 < n < 1 \quad (1)$$

where K and n are isotherm parameters
$C_s$ = inhibitor surface concentration
$C$ = inhibitor solution concentration.

The Freundlich isotherm allows for several kinds of adsorption sites on the solid, as is the case on a rock mineral surface.

k is a constant and it gives information about the level of the plateau on the adsorption isotherm. The larger k is, the more is adsorbed.

A low value of n indicates a high affinity of the inhibitor for the surface. The rate of adsorption will be fast and the plateau of the adsorption curve will be reached at a low concentration of inhibitor in solution.

It is possible to determine the k and n values in equation (1) by analysing the adsorption isotherm. A low value of n is also advantageous from a desorption point of view, as will be outlined below.

The desorption curve will be linear when a log-log plot is made of the concentration of the inhibitor as a function of volume at low concentrations. Using an empirical equation of the form $$C = KV^s \quad (2)$$

$$\log C = \log K + S \log V \quad (3)$$

where K and S are constants $C$ = inhibitor concentration
$V$ = produced volume it can be shown that when V is large $$S = \frac{1}{n-1} \quad (4)$$

S, which is the slope of the desorption curve, can be determined by plotting log C as a function of log V.

For the Freundlich isotherm, the value of n is between 0 and 1, so the maximum and minimum values of S will then be $$n => 0 => S => -1$$

$$n => 1 => S => -\infty \text{(minus infinity)}$$

This means that when n is close to zero, a longer squeeze lifetime can be expected than when n is close to 1. This will determine how many pore volumes of water may flow before the concentration of the inhibitor is below the threshold concentration for preventing scale deposition. At this point, a resqueeze of the well is necessary.

If the value of S is greater than −1, this indicates that another retention process is taking place that is not purely adsorption/desorption.

It is suggested that precipitation of the inhibitor, in addition to adsorption, contributes to long term retention of the inhibitor in the formation. It has been shown for phosphonates, that by manipulating pH, temperature, inhibitor concentration and the calcium concentration, it is possible to enhance adsorption via the calcium salt of the inhibitor. This is also the case with a commercially available phosphinopolycarboxylic acid produced by Ciba-Geigy, as will be shown.

A number of simulated squeeze tests have been performed in order to evaluate the desorption profile and optimum slug design (or injection regime) for different scale inhibitors. One phosphinopolycarboxylic acid and one phosphonate have been compared. In addition to desorption studies, one adsorption isotherm and the phase envelopes for both these inhibitors have been obtained. Dynamic efficiency testing has also been undertaken.

DETAILED DESCRIPTION OF THE PREFERRED EMBODIMENTS

Figure 1:
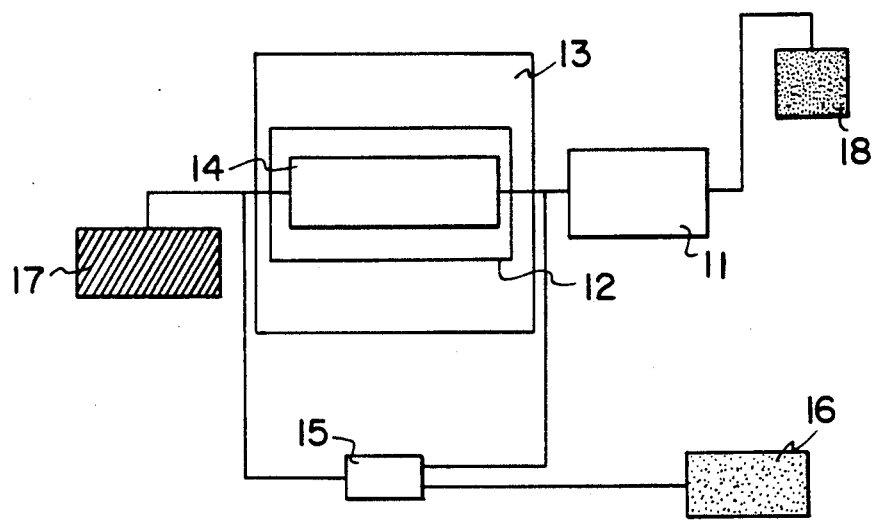
FIG. 1 is a schematic view of the apparatus used in adsorption/desorption tests.

The experimental set up for the adsorption/desorption tests is given in FIG. 1. It includes a pump 11 and coreholder 12 placed in a heating cupboard 13. The pressure drop over a core 14 in the coreholder 12 is measured by a transducer 15. The pressure is logged on a chart recorder 16. Core backpressure is set by a back pressure regulator (not shown). All effluents are collected in an autosampler 17. The system allows the liquids to be pumped from a reservoir 18 through the core in both directions. The pressure drop across the core is recorded in order to monitor any pressure build-up during the test. Pressure fluctuations may be due to precipitation of the inhibitor and are therefore important. The cores 14 are of sandstone and measure 3 inches (7.6 cm) in length by 1½ (3.8 cm) in diameter.

The phosphinopolycarboxylic acid has a molecular weight (Mw) of 3500–4000. The phosphino group is present in order to make the inhibitor easy to detect. The phosphonate used was a diethylenetriaminepenta (methylenephosphonic acid) (DETAPMP). Both inhibitors were detected using the "Norwegian Standard for Total Phosphorus". (NS4725-1974)

Figure 2:
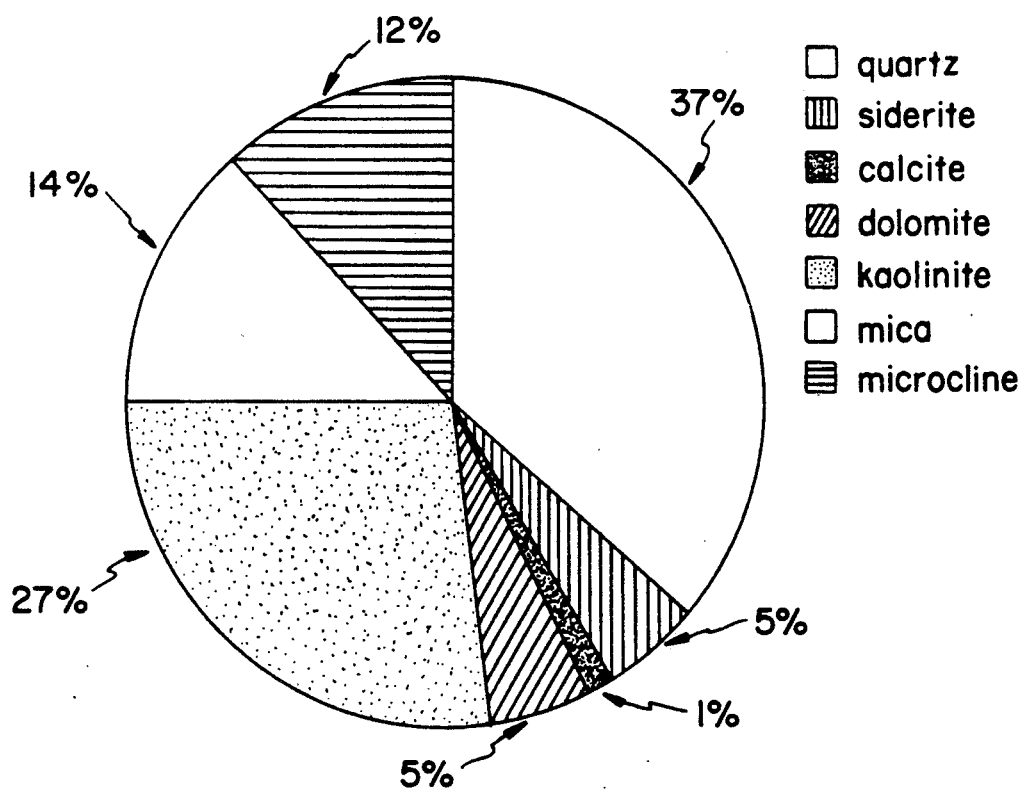
FIG. 2 is a representation of the mineralogy of the cores used in the adsorption/desorption tests.

All the adsorption/desorption tests were run using micaceous sandstone cores. The mineralogy of the cores is given in FIG. 2. As can be seen, there is a high percentage of kaolinite in this formation, one sample of which has a high content of dead-end pores. During the squeeze operation a proportion of the injected inhibitor may diffuse into these dead-end pores and the extent to which it is recovered may be limited. The production period before the next squeeze treatment must be quite long in order to recover the inhibitor so diffused.

The kaolinite also has an effect on the adsorption of the inhibitor. Clay both increases the amount adsorbed and the adsorption rate. The kaolinite may also, in the presence of divalent ions, lead to a higher degree of irreversible adsorption.

Desorption studies

The chosen slug design is injected into the core at a rate of 0.4 ml/min. The last slug is followed by injection of a volume of formation water equal to the dead volumes in tubing and fittings between the pump and the core. The slug(s) are kept in the core for 14 hours at 55° C. followed by 2 hours at 70° C., for test set 2 and at 50° C. for 16 hours for test set 1. Formation water is then injected into the core at a rate of 0.4 ml/min in a reverse flow direction until the effluent inhibitor concentration reaches a critical minimum. The effluent is continuously sampled by the autosampler. The pressure drop over the core is recorded continuously in order to check whether there has been any abnormal pressure build-up.

Test 1

Phosphinopolycarboxylic acid and Phosphonate were tested. Both inhibitors were tested with and without calcium present. The slug designs are given in Table 1. The calcium concentrations were selected with reference to compatibility plots in order to avoid precipitation during injection. Data for the cores used in these tests are given in Table 2. Runs 1, 2 and 3 are the phosphonate tests, while 4 and 5 are the phosphinopolycarboxylic acid tests. Run 3 is a resqueeze on the same core and under the same conditions as Run 2.

Test 2

A number of slug designs (Runs 6–13) were tested in order to find an optimum formulation. The slug designs for the different tests are given in Table 3. Run nos. 6–12 are all phosphinopolycarboxylic acid and Run no. 13 is the phosphonate. Data for the different cores used in the tests are given in table 4.

Adsorption studies

An initial (low) concentration of inhibitor is circulated through the core for 20 hours. The procedure is repeated for a number of concentrations until the adsorption level is reached. Before each new concentration is introduced, the equilibrium concentration in the solution is measured. By mass balance the amount of adsorbed inhibitor can be determined. The adsorption profile is plotted in log-log scale in order to determine the two constants in the Freundlich equation. The adsorption isotherm has thus been obtained.

Dynamic testing of scale inhibitor efficiency

Seawater and formatioan water with compositions as shown in Tables 7 and 8 are mixed at the entrance of the capillary tubing. Before mixing, the solutions are heated to a temperature that is comparable to the reservoir temperature. The seawater contains the inhibitor. The pressure drop over the capillary tubing is measured continuously as the liquids are pumped through the tubing at a constant volume flow rate. At a given increase in the pressure drop, due to precipitation, the inhibitor efficiency is calculated.

The test is repeated for several concentrations, in order to find the lowest concentration that will give the desired efficiency. The results are shown in Tables 5 and 6.

Phase behaviour evaluation

Evaluation of the phase behaviour is carried out by varying the pH and the concentration of $Ca^{2+}$ added to the solution of inhibitor in seawater.

The test evaluates, for a given pH, the salinity inhibitor concentration and calcium concentration at which the inhibitor starts to precipitate. The seawater is titrated with a calcium solution. For each drop of calcium solution added to the water, the turbidity is measured. The calcium concentration in the seawater is increased, drop by drop, until the turbidity is observed. Precipitation has then started. The procedure is repeated for a range pH values.

RESULTS

Efficiency data

From Tables 5 and 6, the phosphinopolycarboxylic acid is the most efficient inhibitor tested. Though the figures are not all directly comparable, as the efficiency is measured at different pH and temperature, the phosphinopolycarboxylic acid has an efficiency of 90% at 2.5 mg/l (75° C., pH 5.3) and 90% efficient when the phosphonate concentration is 12 mg/l (100° C., pH 4). The phosphonate has a lower efficiency at pH 8 (see Table 6).

Phase behaviour

Figure 3:
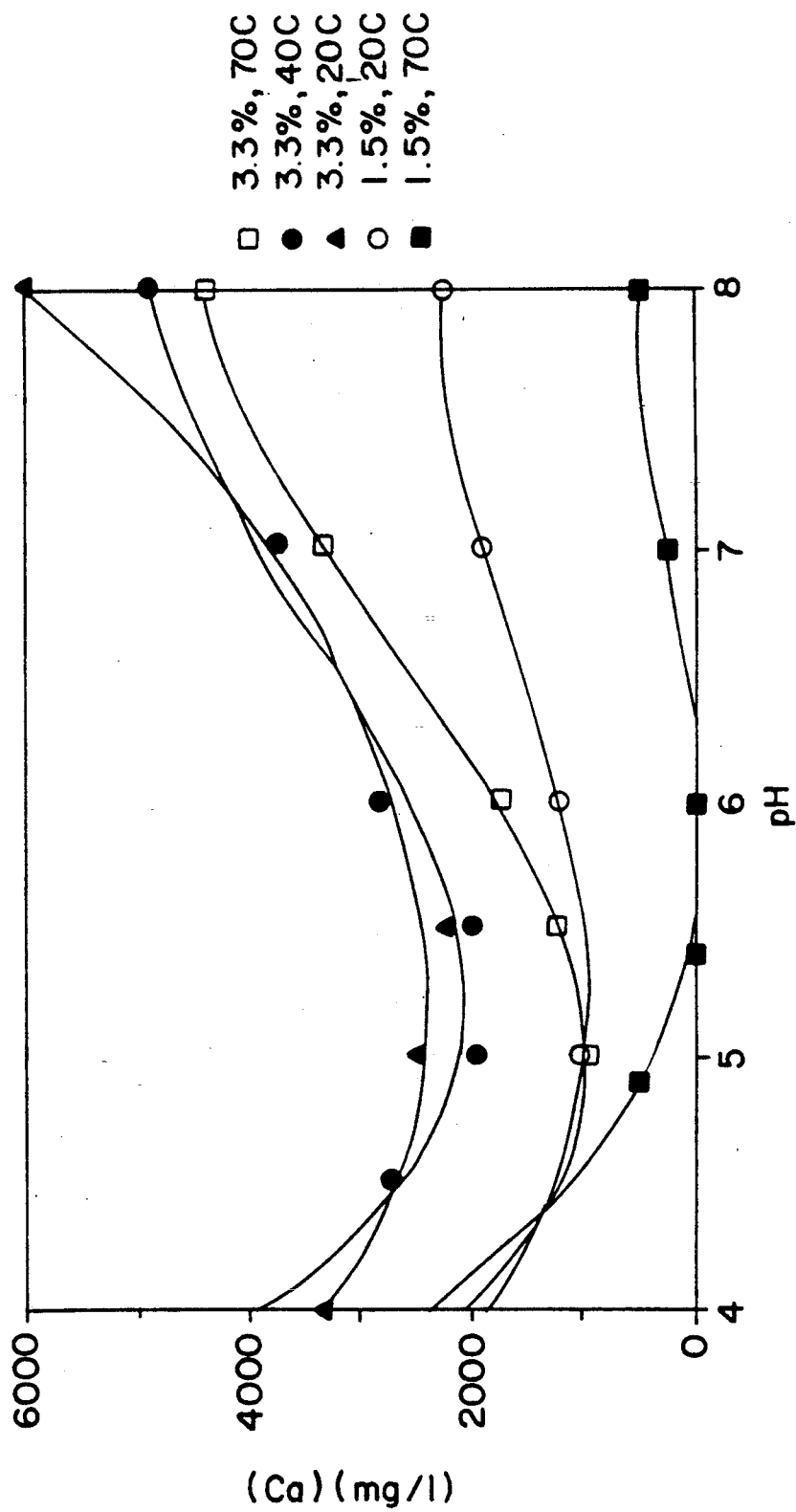
FIG. 3 is a graph of the phase behaviour of phosphorate under different conditions.
Figure 4:
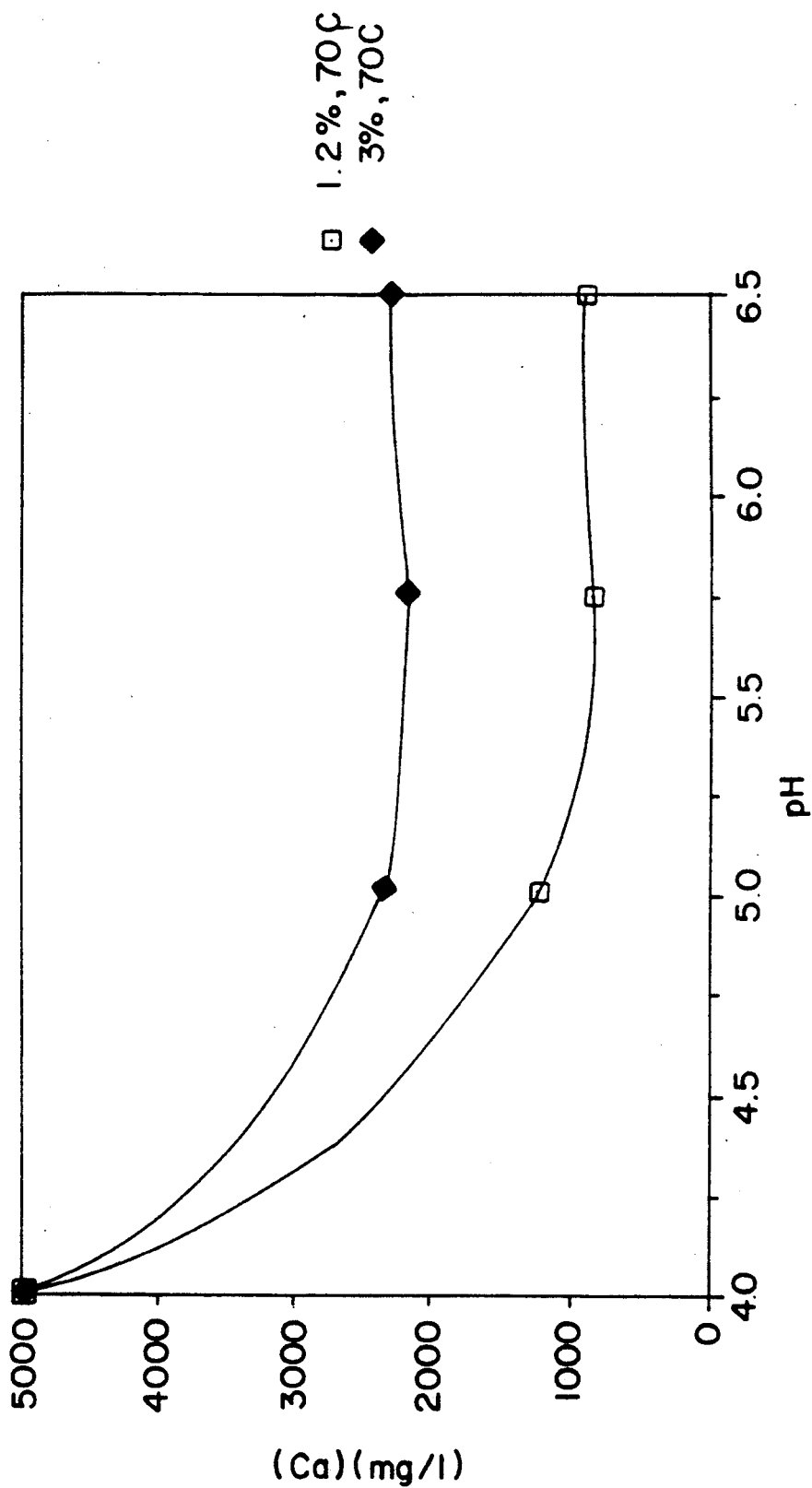
FIG. 4 is a graph similar to FIG. 3 for phosphinopolycarboxylic acid.

FIG. 3 shows the phase behaviour of the phosphonate under different conditions and FIG. 4 shows the phase behaviour for the phosphinopolycarboxylic acid. As can be seen, both the phosphinopolycarboxylic acid and the phosphonate precipitate at lower calcium concentrations when the inhibitor concentration decreases.

Increasing temperature has the same effect on the inhibitors as decreasing the concentration. For the phosphonate (at a concentration of 3.3% and pH 5), an increase in temperature from 20° to 70° C. will reduce the calcium compatibility limit from 2500 mg/l to 900 mg/l. Reducing the concentration from 3.3% to 1.5% at 70° C. and pH 5, will reduce the calcium compatibility limit from 900 mg/l to 400 mg/l. Lowering the pH to 2-3 increases the tolerance to $Ca^{2+}$ dramatically. The results show that both temperature, inhibitor concentration and pH can be used to control precipitation. The $Ca^{2+}$ concentrations quoted ignore the fact that $Ca^{2+}$ is present in seawater, approx 450 mg/l.

The phase behaviour of the inhibitor is important to its mixing and pumping. For successful injection, a clear solution with no precipitation is vital. When the inhibitor is safely in place beyond the wellbore area a mechanism that can lead to precipitation of the inhibitor must be activated. From the phase diagrams in FIGS. 3 and 4, it is evident that dilution of the inhibitor solution due to mixing and diffusion will increase the chance of forming a precipitate. An increased temperature will have the same effect. This is exactly what should happen during injection and shut-in of the scale inhibitor, provided a sufficient soak time is allowed. If, in addition, the formation pores and mineral surfaces are saturated with $Ca^{2+}$, the chances of producing a deposit of a Ca-salt of the inhibitor is even more likely. This is done in practice with a preflush of $CaCl_2$ solution.

If the formation can tolerate a low pH inhibitor system and has calcite as a mineral in the formation rock, dissolution of calcite will increase the $Ca^{2+}$ concentration which again can lead to precipitation. In the cores used, calcite is part of the cementing material in the formation. Removal of this calcite will severely affect the mechanical strength of the rock, and its removal may easily lead to sand production. Low pH is thus best avoided.

Desorption profiles

The results from Test 1 are considered in more detail in order to determine whether or not the desorption profile can be described by an exponential function. If so, a prediction can be made for the desorption profile beyond the test conditions. Test no. 1 includes Runs 1-5 and Test no. 2 includes Runs no. 6-13

Figure 5:
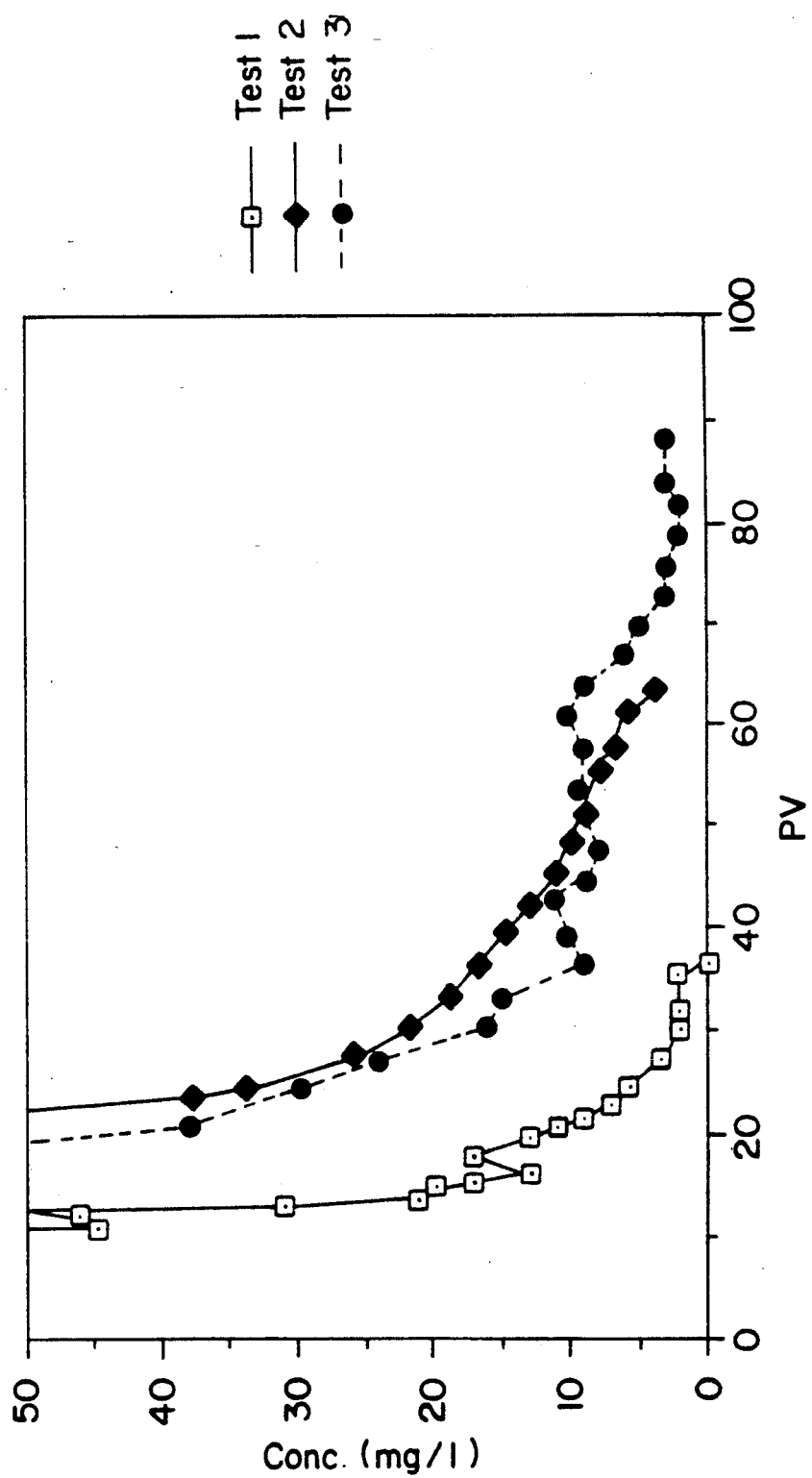
FIGS. 5 and 6 are graphs of the desorption profiles for the phosphonate and phosphinopolycarboxylic acid, respectively.
Figure 6:
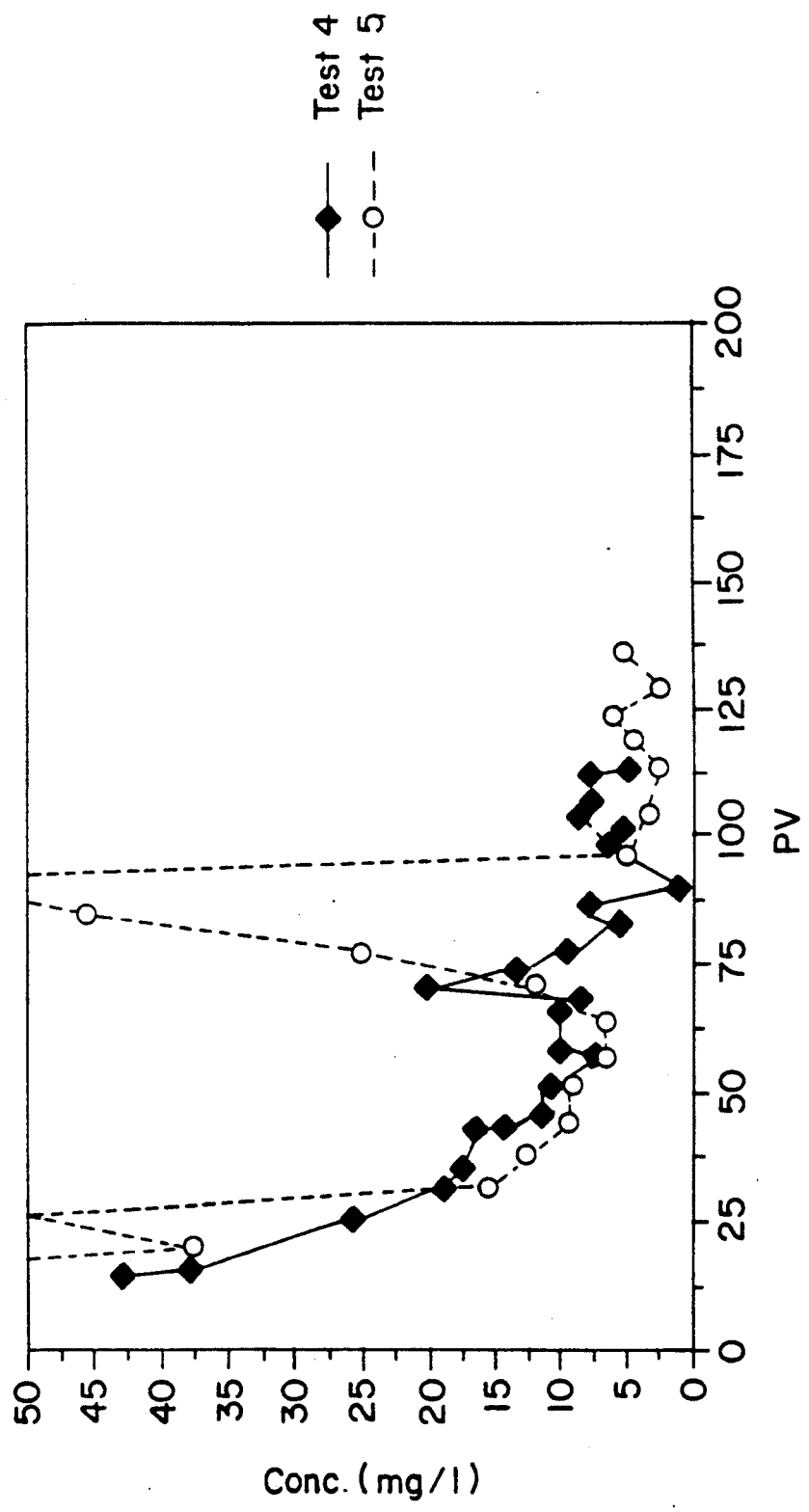
Figure 7:
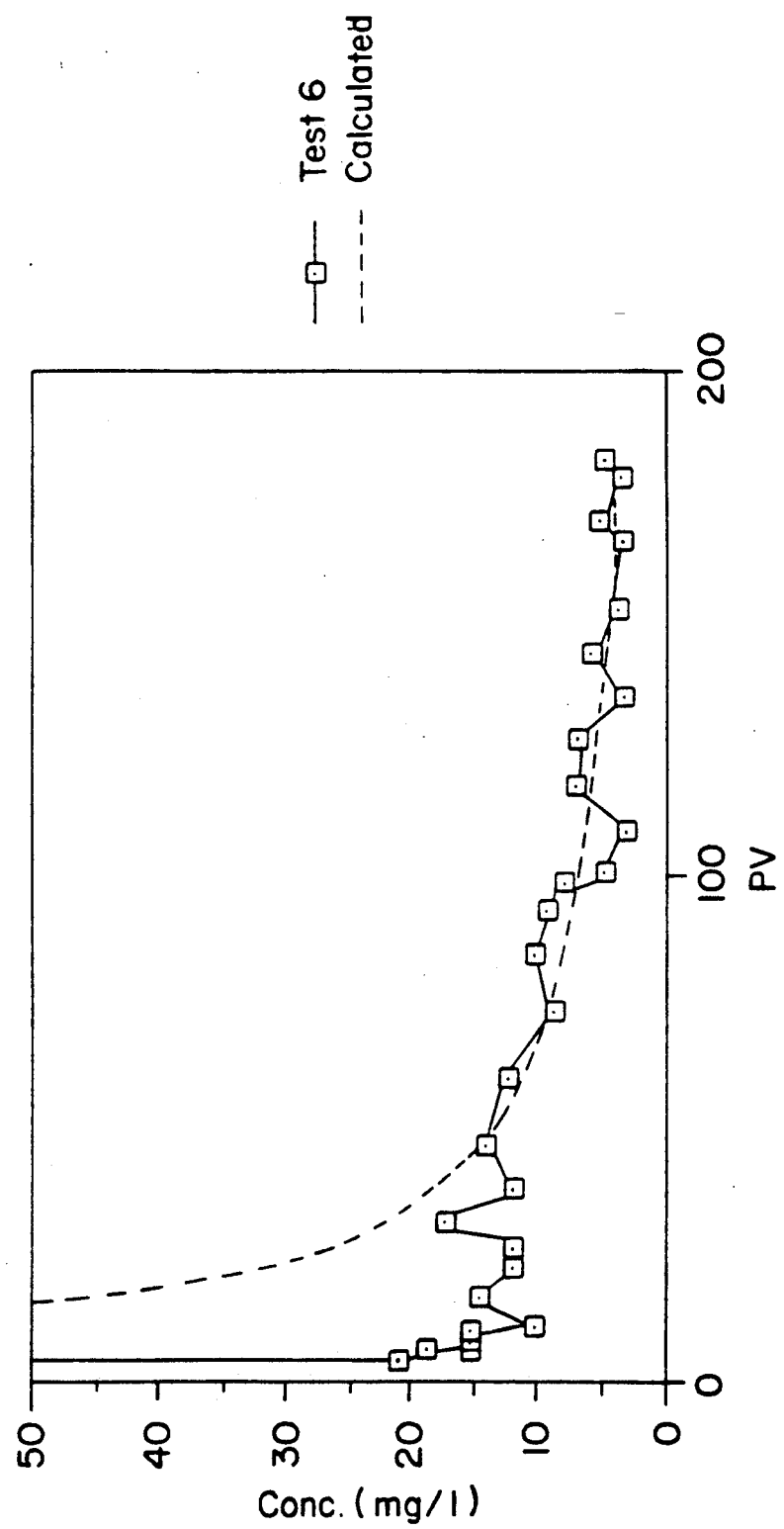
FIGS. 7 to 13 are graphs of the desorption profiles for phosphinpolycarboxylic acid.
Figure 8:
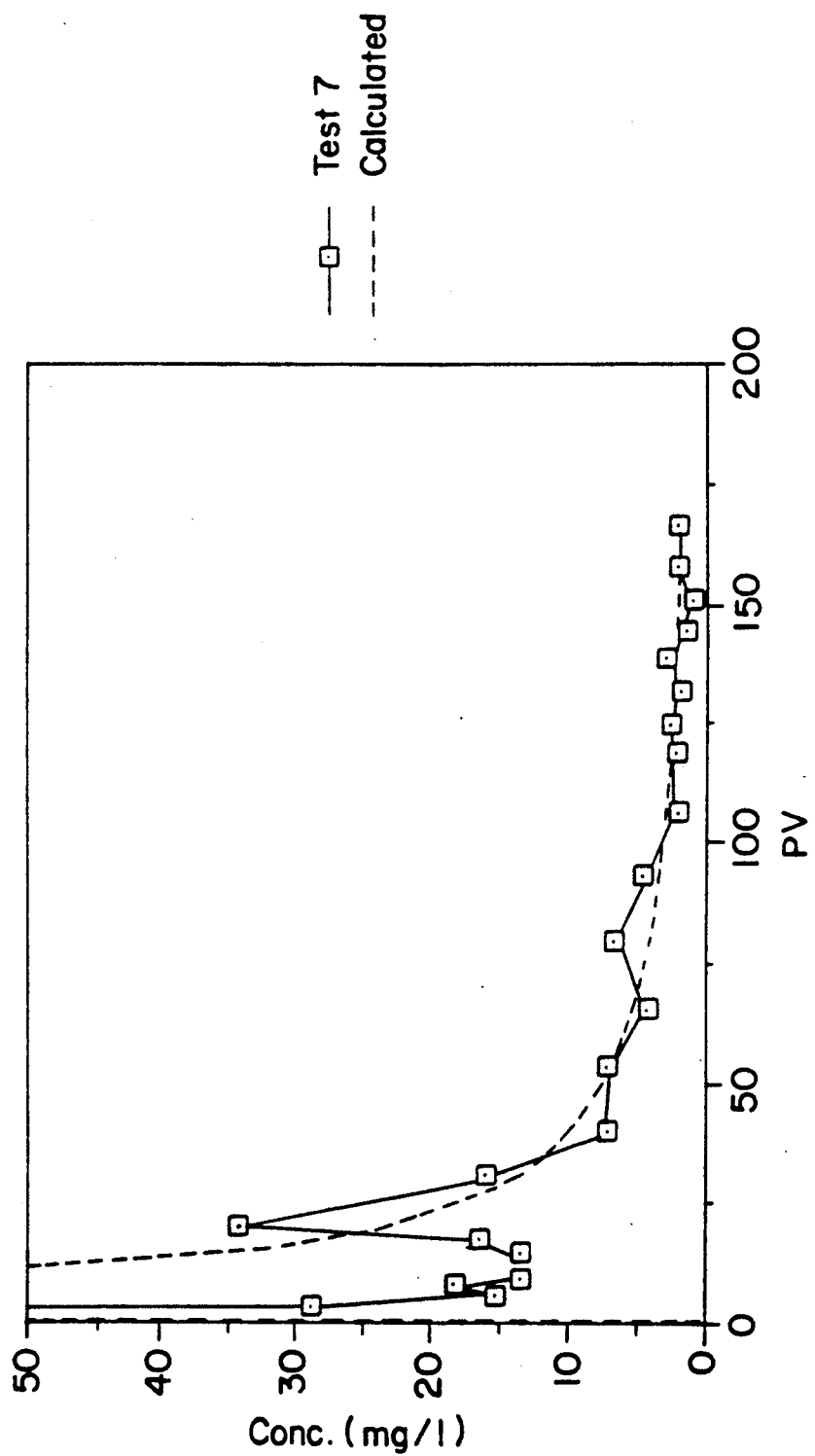
Figure 9:
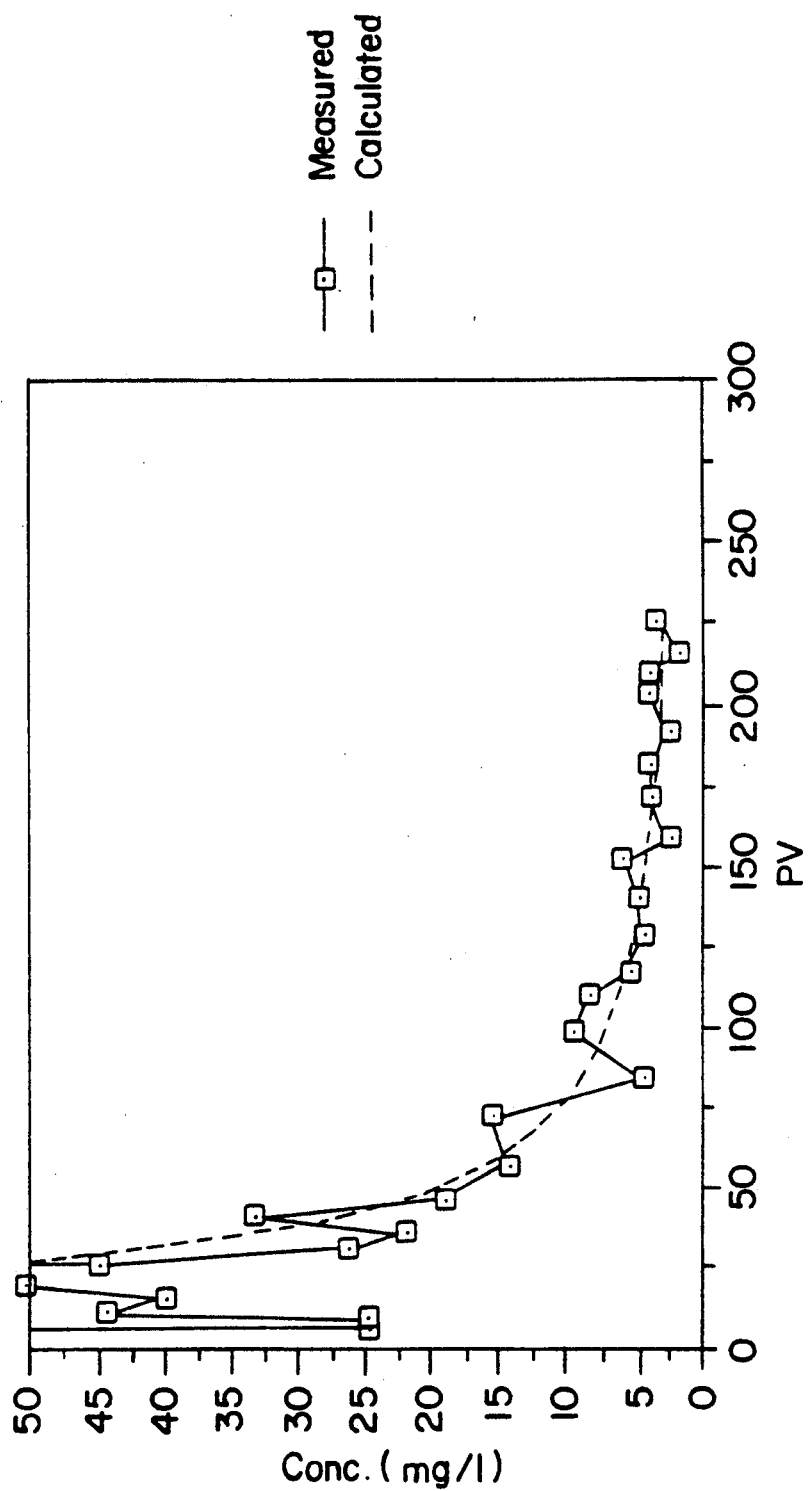
Figure 10:
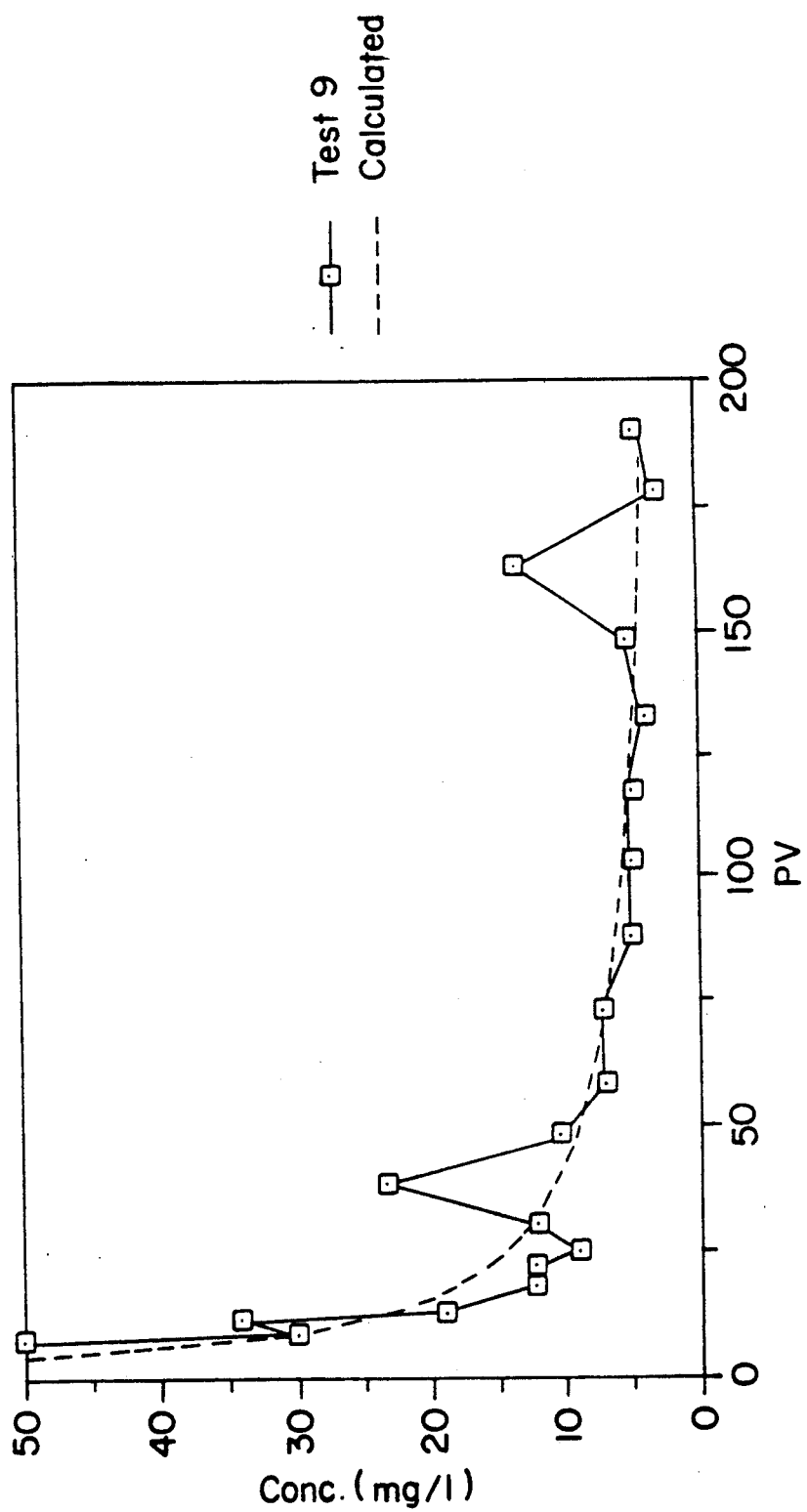
Figure 11:
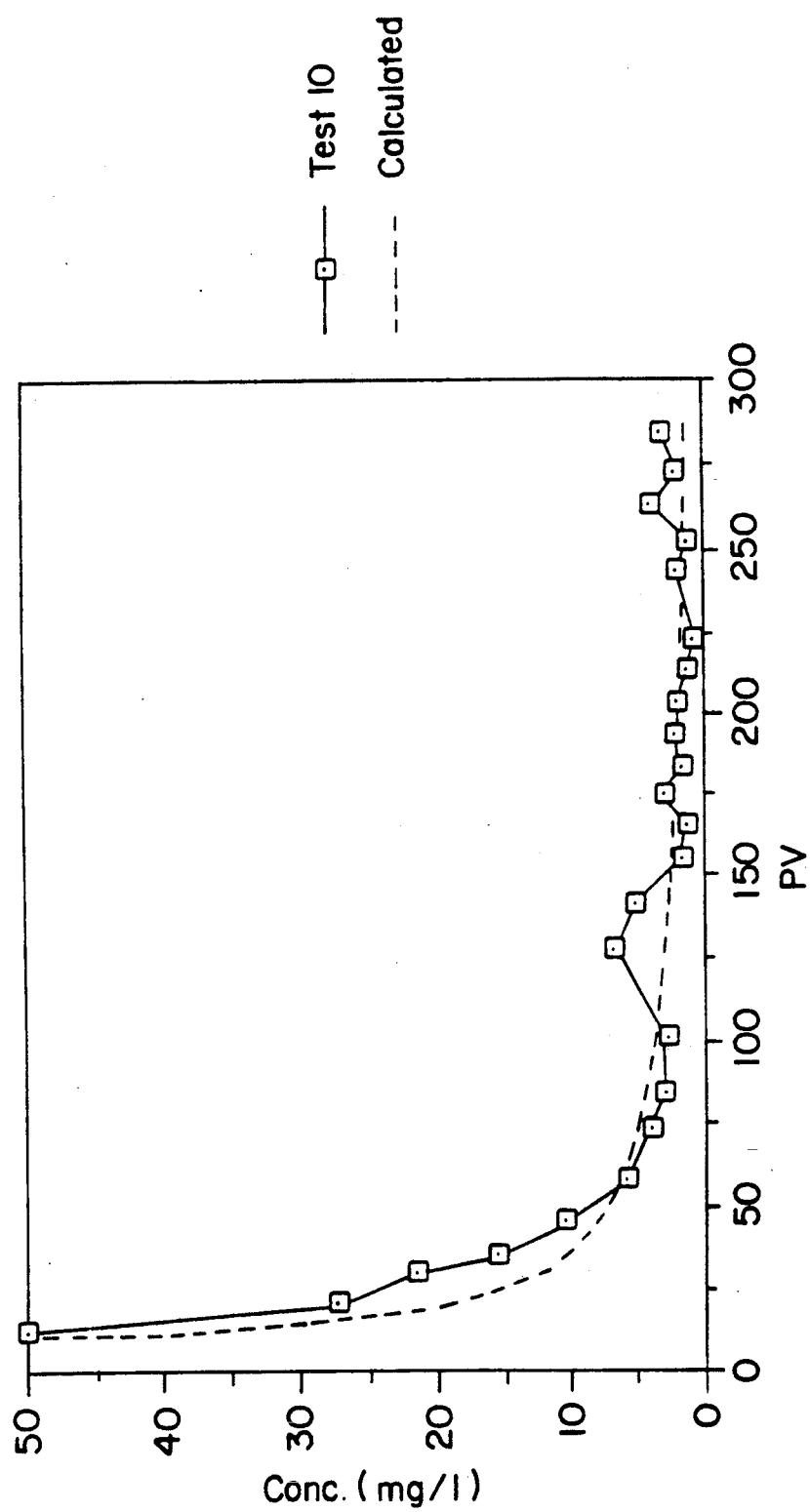
Figure 12:
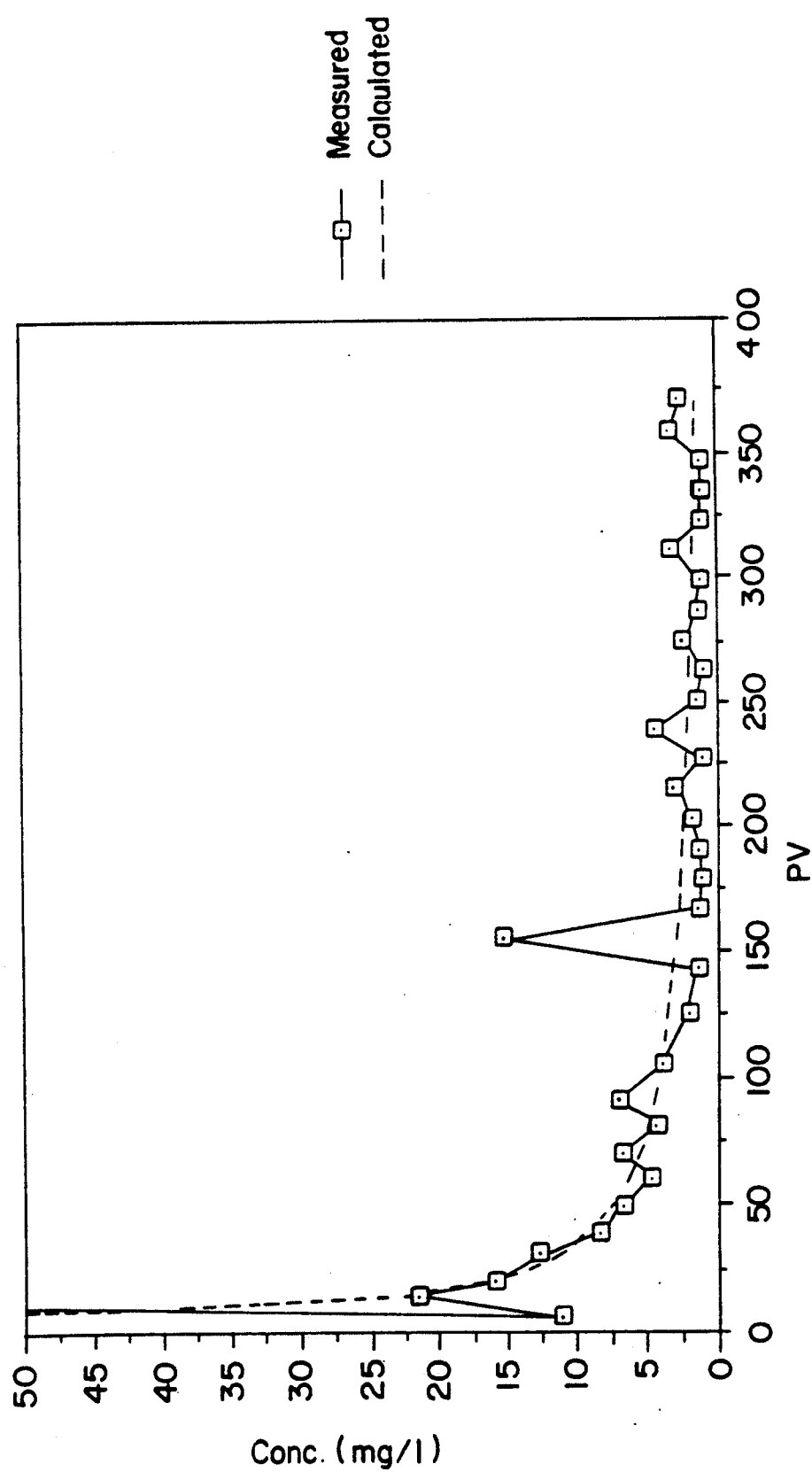
Figure 13:
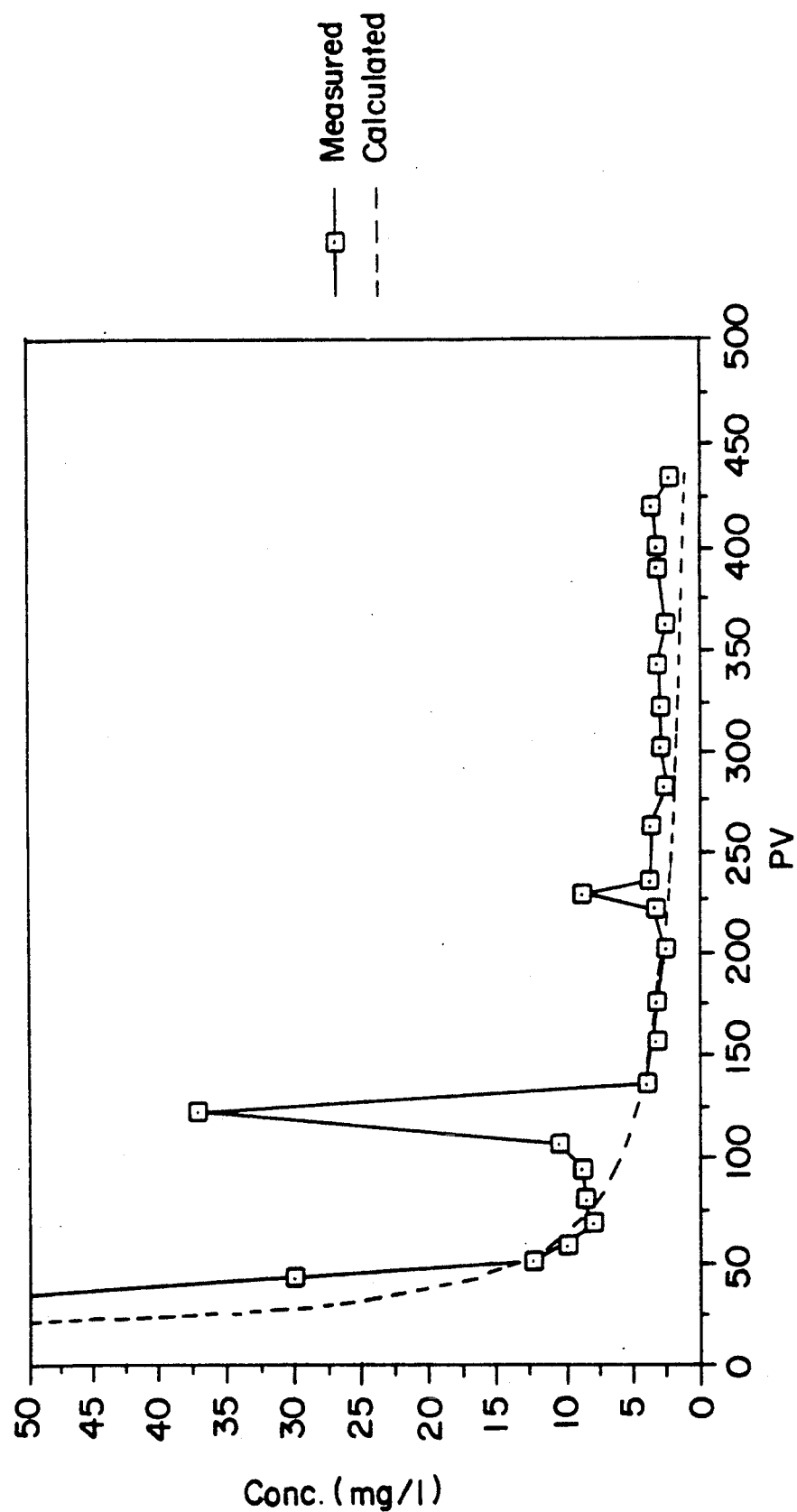

FIG. 5 shows the desorption profiles for phosphonate from Test 1. FIG. 6 shows the desorption profiles for phosphinopolycarboxylic acid obtained in Test 1. Based on the efficiency and the desorption curves a calculated squeeze lifetime can be estimated as shown in table 9.

Figure 14:
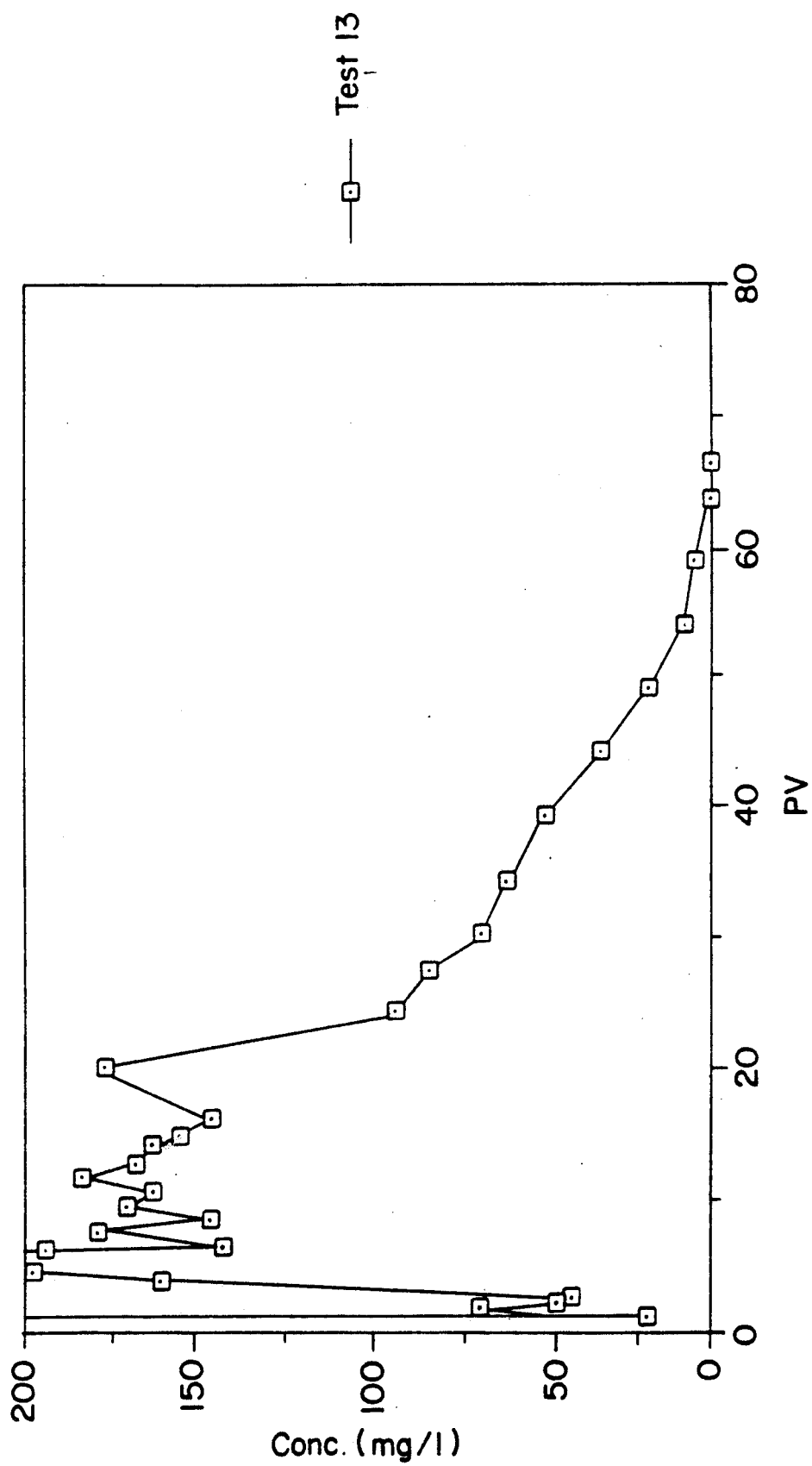
FIG. 14 is a graph of the desorption profile for the phosphonate.

Desorption profiles for the different tests of phosphinopolycarboxylic acid in Test 2 are given in FIGS. 7-13. FIG. 14 describes the desorption profile for the phosphonate. The dotted curves in FIGS. 7-13 are the desorption profiles described by equation (2). This equation was fitted to the observed data. It shows that the last part of the desorption profile, in this test between 50 Pore Volumes and 200 Pore Volumes, is indeed exponential. This means that the last part of the desorption profile will be a straight line when plotted on log-log scale. Equation (2) can then be presented as in equation (3), and K and S can be found by linear regression. Estimated values for K and S are given in Table 10.

Figure 15:
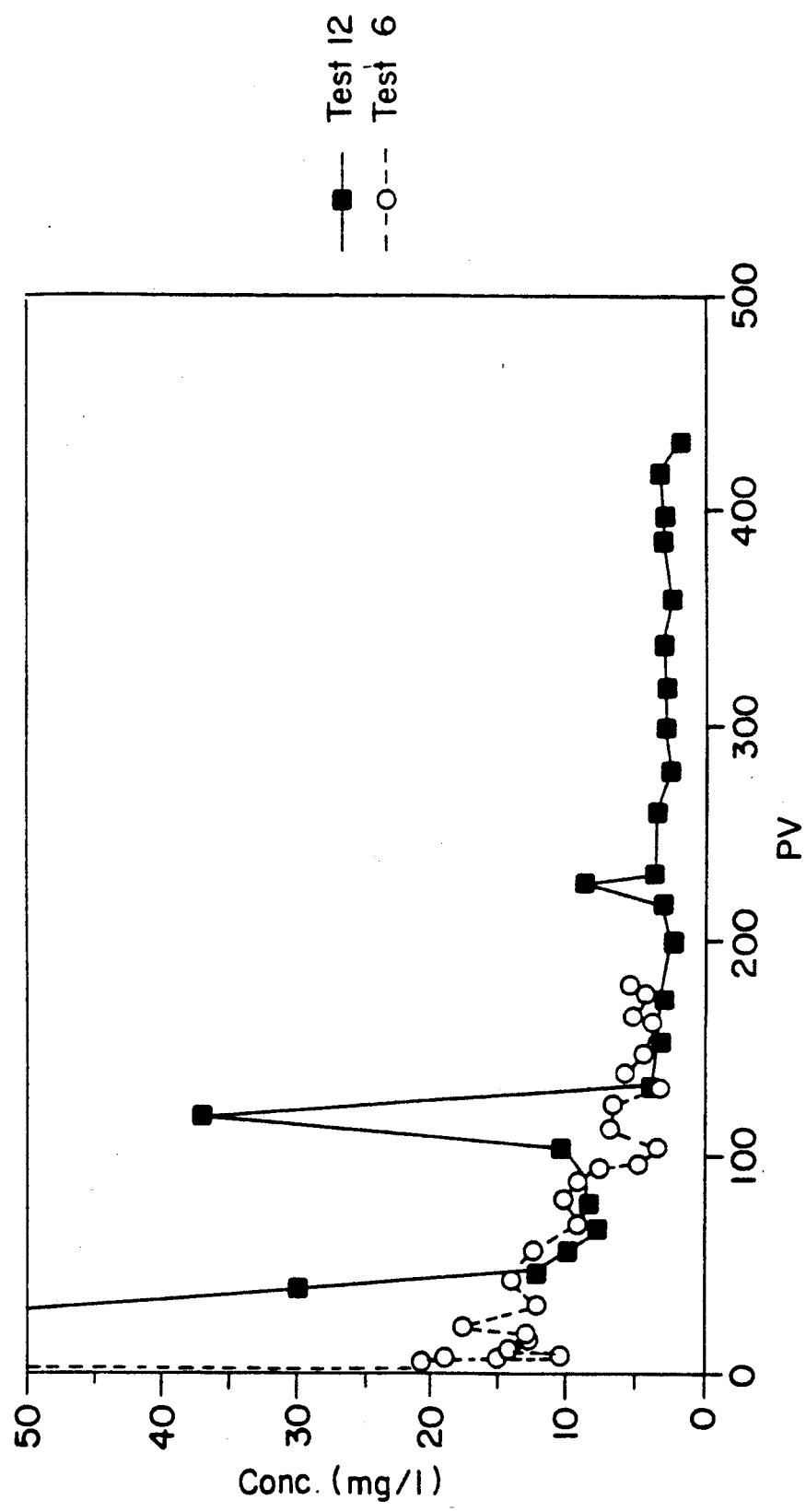
FIGS. 15 to 18 are graphs of comparative desorption profiles for phosphinopolycarboxylic acid.
Figure 16:
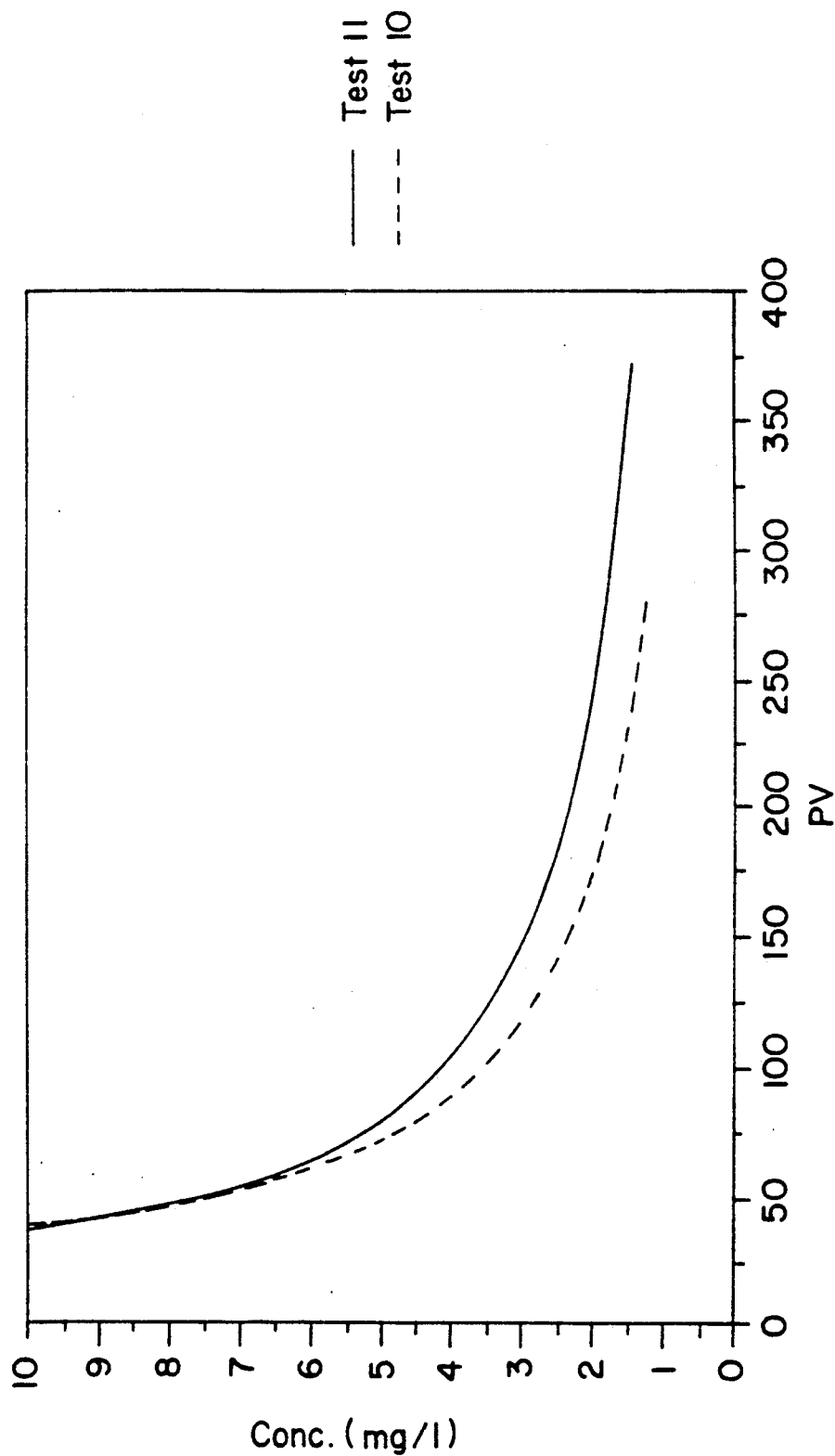
Figure 17:
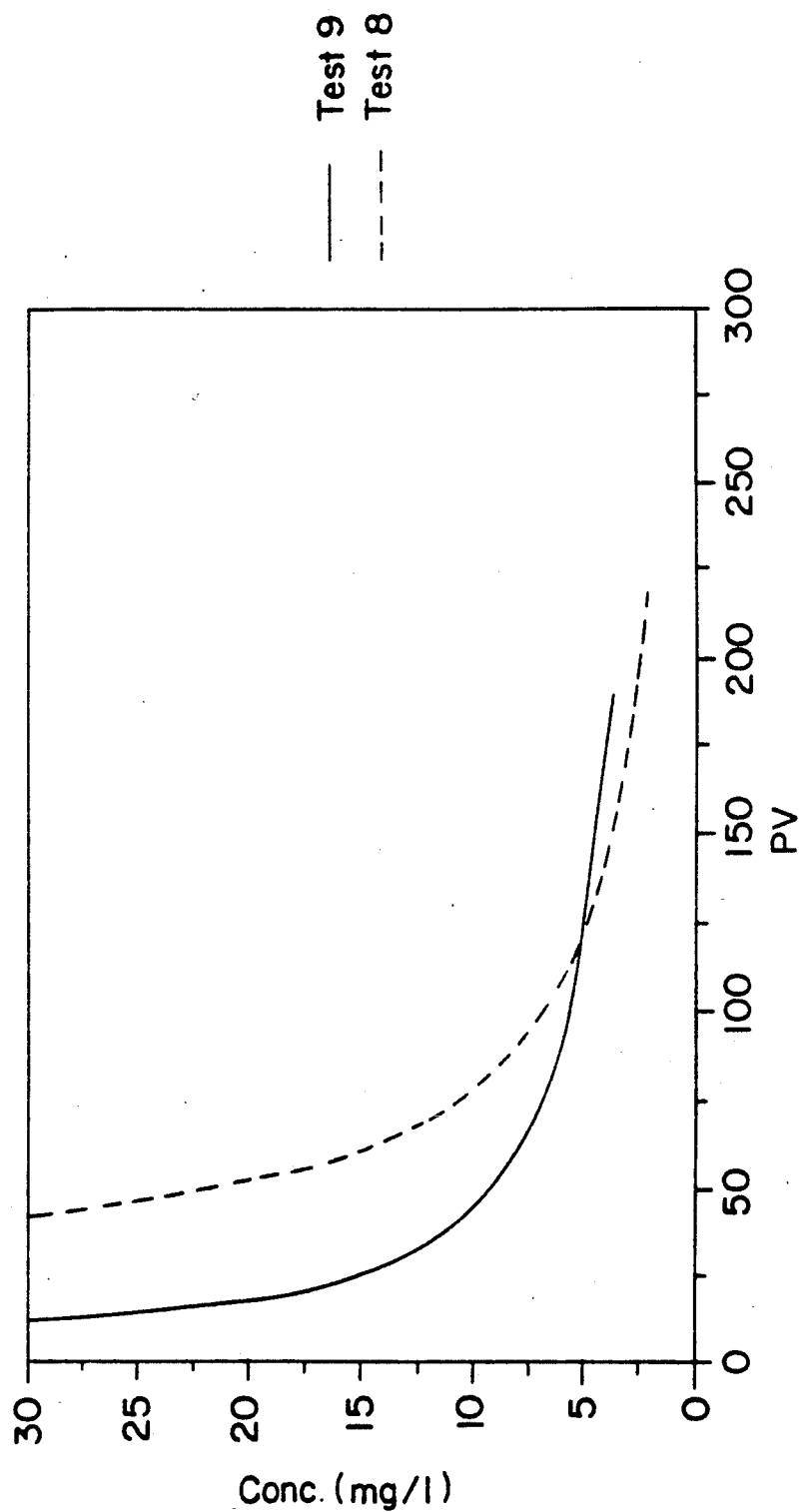
Figure 18:
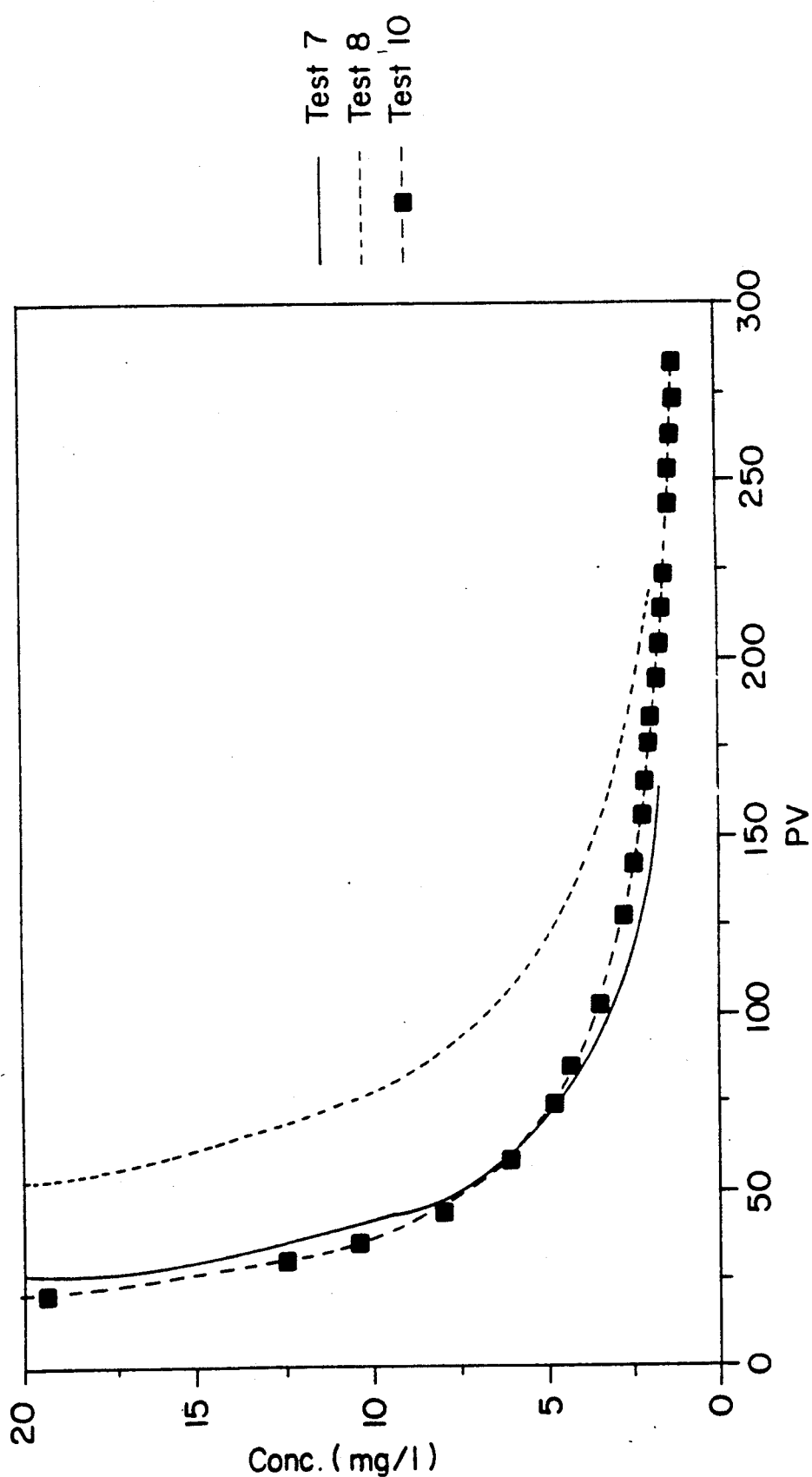

FIG. 15 compares the two blank tests which were performed on different cores (test 6 and 12). FIG. 16 compares the resqueeze with the first squeezes (Runs 10 and 11). FIG. 17 compares addition of 2000 mg/l Ca with the addition of 3000 mg/l to the inhibitor solution before injection into the core (Runs 8 and 9). FIG. 18 compares the case where 2000 mg/l Ca is added to the inhibitor solution with 2000 mg/l Ca in pre- and afterflush (Runs 8, 7 and 10). Table 11 shows the squeeze lifetime for all the tests based on equation (2), when the inhibitor concentration limits are set to 1,2 and 5 mg/l.

In table 12, the inhibitor recovery is given at different effluent concentrations. The recovery is calculated by numerical integration of the observed concentration profiles (FIG. 7-14).

Desorption-Test 1

The desorption curves from test 1 show that with no addition of Ca, the phosphinopolycarboxylic acid is the better inhibitor with regard to squeeze lifetime. With the addition of suitable amounts of $Ca^{2+}$, the squeeze lifetime was increased for the phosphonate while no change was observed for the phosphinopolycarboxylic acid tested. Although the squeeze lifetime for the phosphonate more than doubled, the phosphinopolycarboxylic acid still has the longest squeeze life time.

Desorption-Test 2

From test 2, Run 13, the phosphonate showed similar behaviour to the phosphonate in test 1. With the procedures used in these tests, the phosphonate is inferior compared to the phosphinopolycarboxylic acid.

It can be seen that a resqueeze has a slightly longer squeeze life time than the initial squeeze.

It can also be seen that the addition of 3000 mg/l calcium in the inhibitor solution gives a longer squeeze life than the addition of 2000 mg/l. This is illustrated in FIG. 17. The results in FIG. 6 from test 1 confirm that the addition of calcium in the compatible region has little effect on the lifetime of a squeeze for a phosphinopolycarboxylic acid. In all those cases where 2000 mg/l were added, either as a pre-, post- or in-solution additive, the squeeze lifetime was shorter than for the blank test. Only when 3000 mg/l calcium was added to the solution was the squeeze lifetime increased. This could be due to precipitation of the inhibitor.

Figure 19:
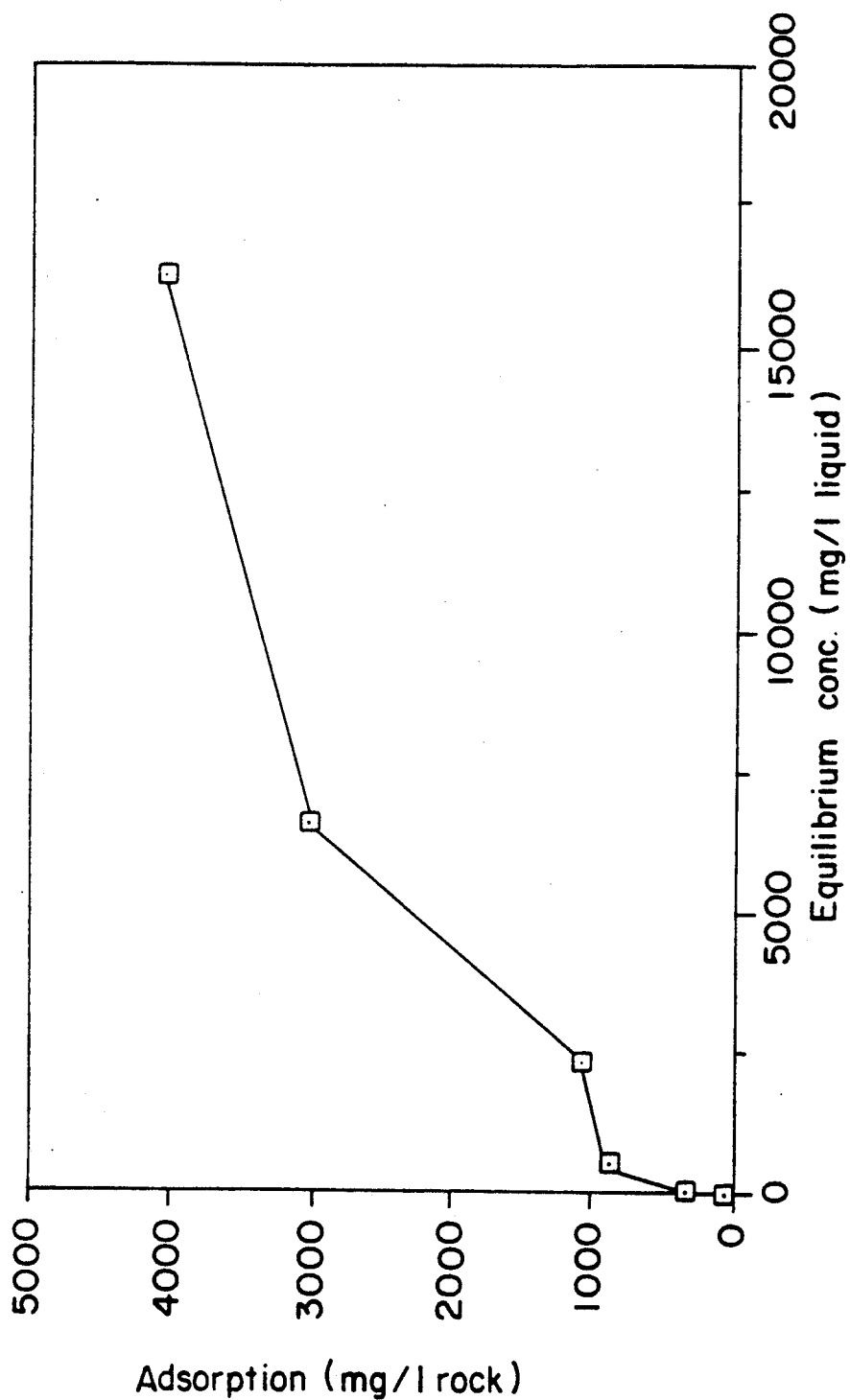
FIGS. 19 and 20 are graphs of the adsorption profile for phosphinopolycarboxylic acid on a linear scale and a log-log scale respectively.
Figure 20:
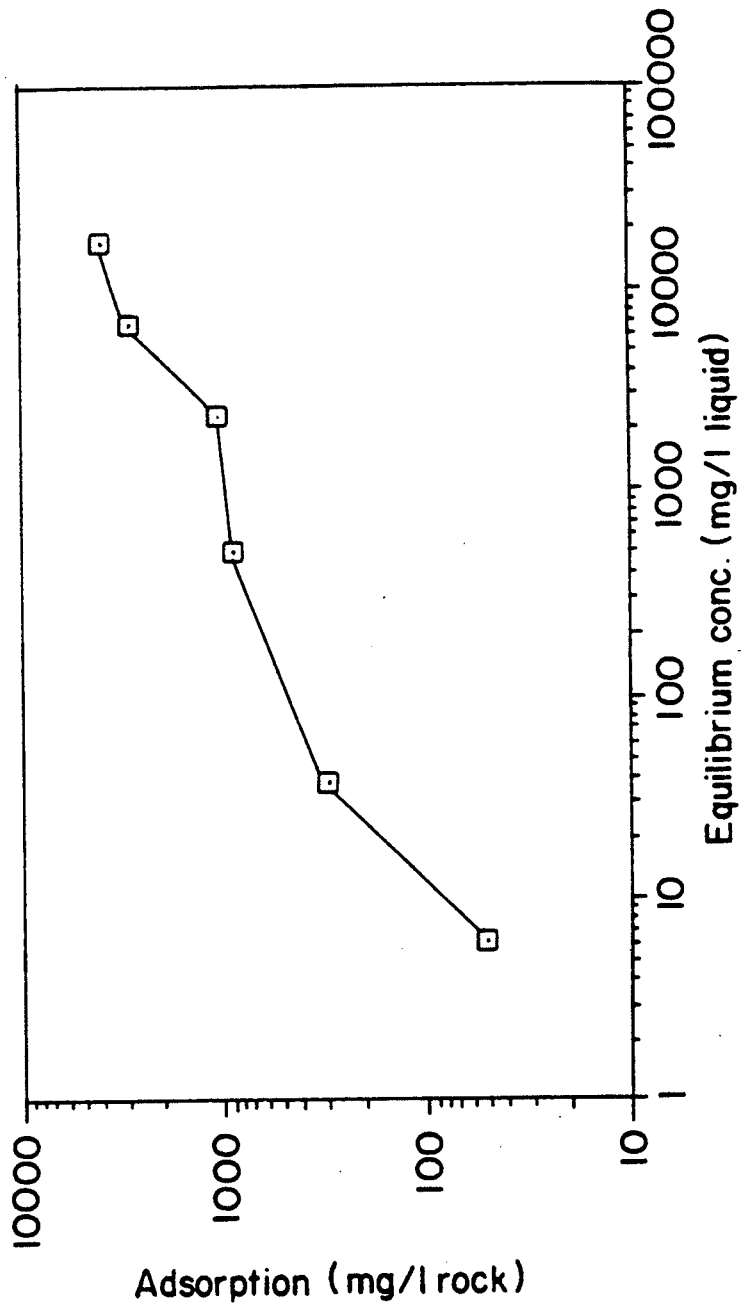
Figure 21:
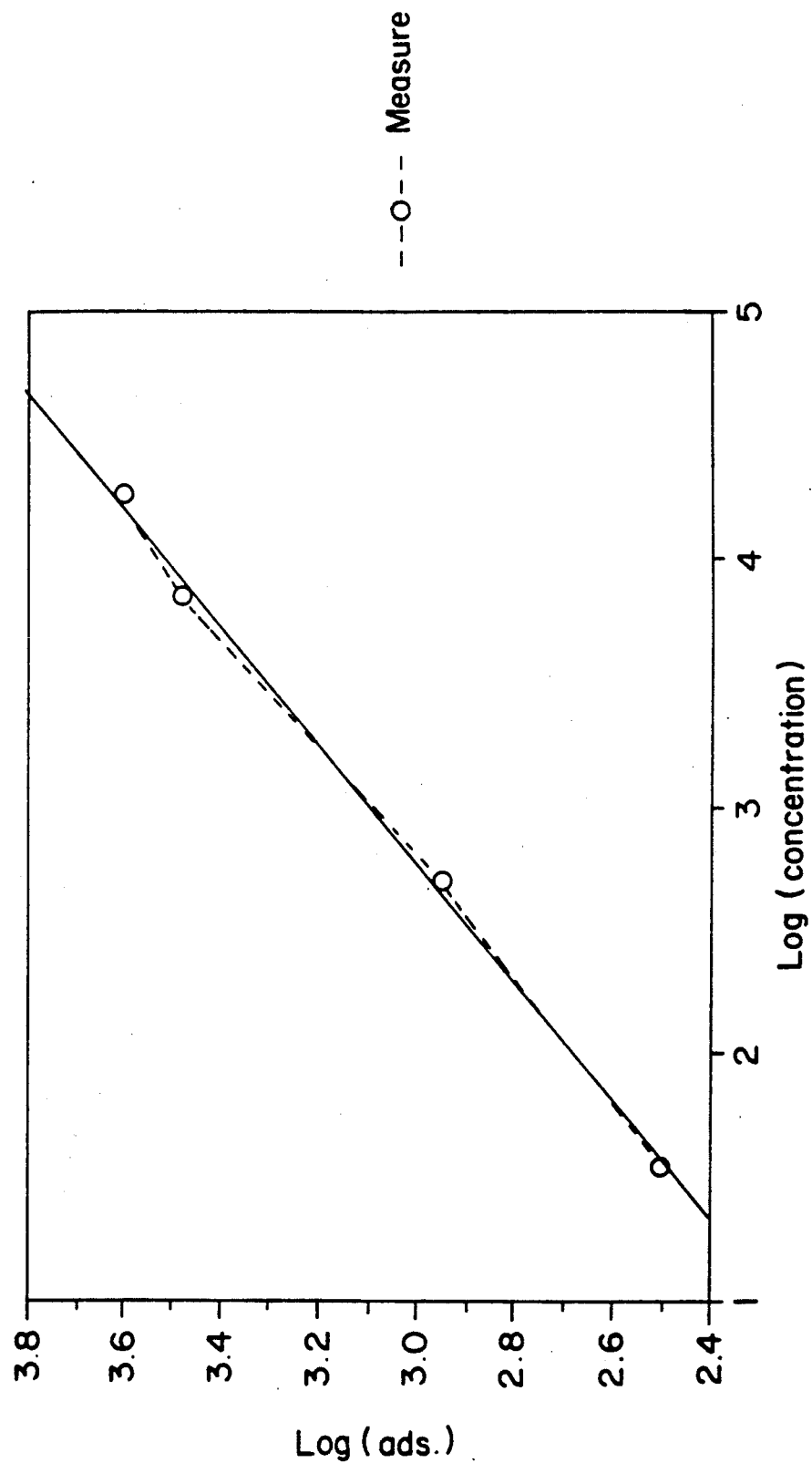
FIG. 21 shows a curve fitted to the graph of FIG. 20.
Figure 22:
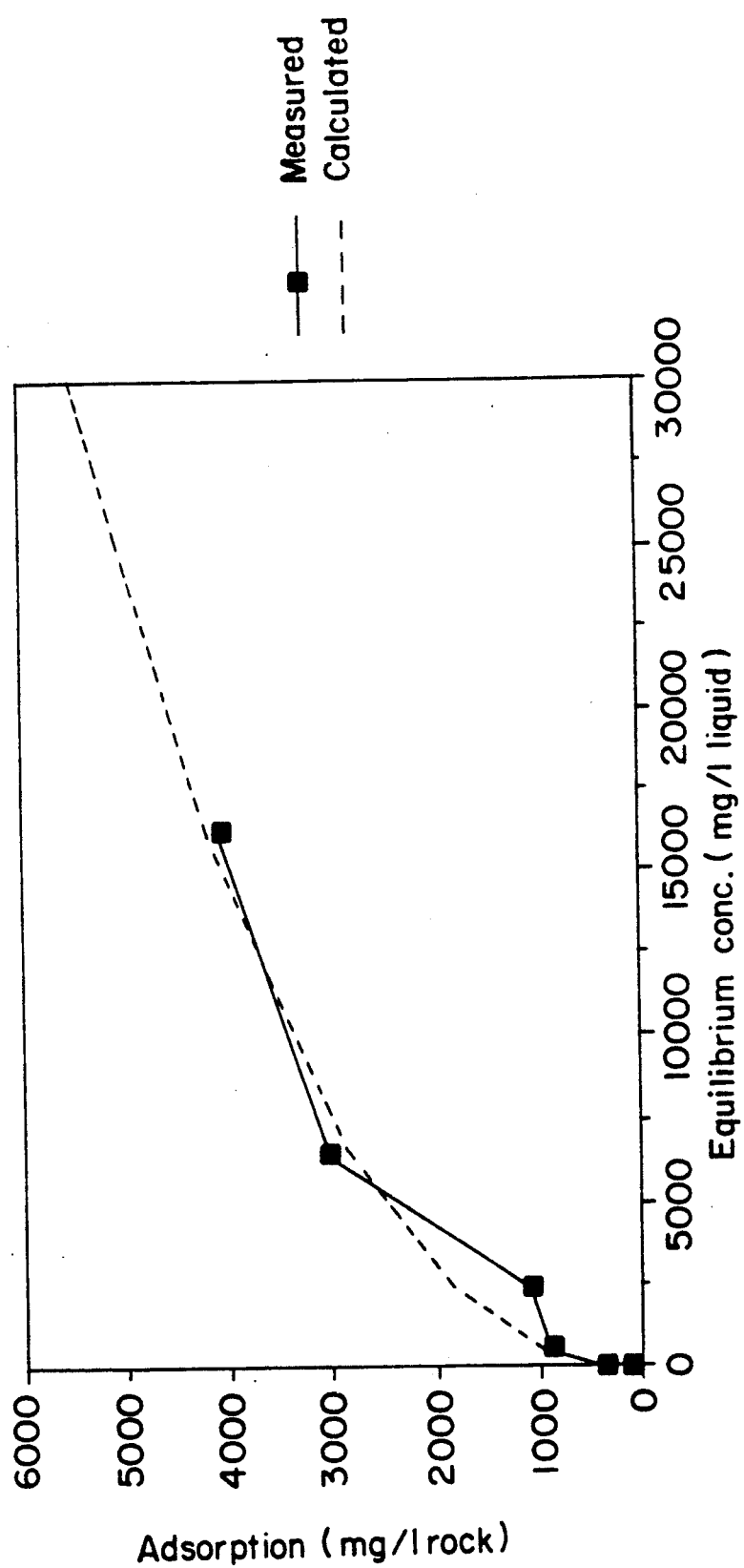
FIG. 22 is a graph of the measured and calculated Freundlich adsorption profile.

The adsorption profile for the phosphinopolycarboxylic acid is plotted on a linear scale in FIG. 19 and as a log-log plot in FIG. 20. FIG. 21 shows the curve fit on a log-log plot based on four points from the adsorption curve. The values for k and n in the Freundlich isotherm equation (1), were found to be k=67.2 and n=0.43. FIG. 22 shows the measured and calculated Freundlich adsorption profile. It can be seen from the measured data that the isotherm has a tendency to flatten out at about 1000 mg/l rock. This is interpreted as the monolayer adsorption level. Due to interactions between adsorbed phosphinopolycarboxylic acid and phosphinopolycarboxylic acid in solution, the adsorption grows to a multilayer.

Figure 23:
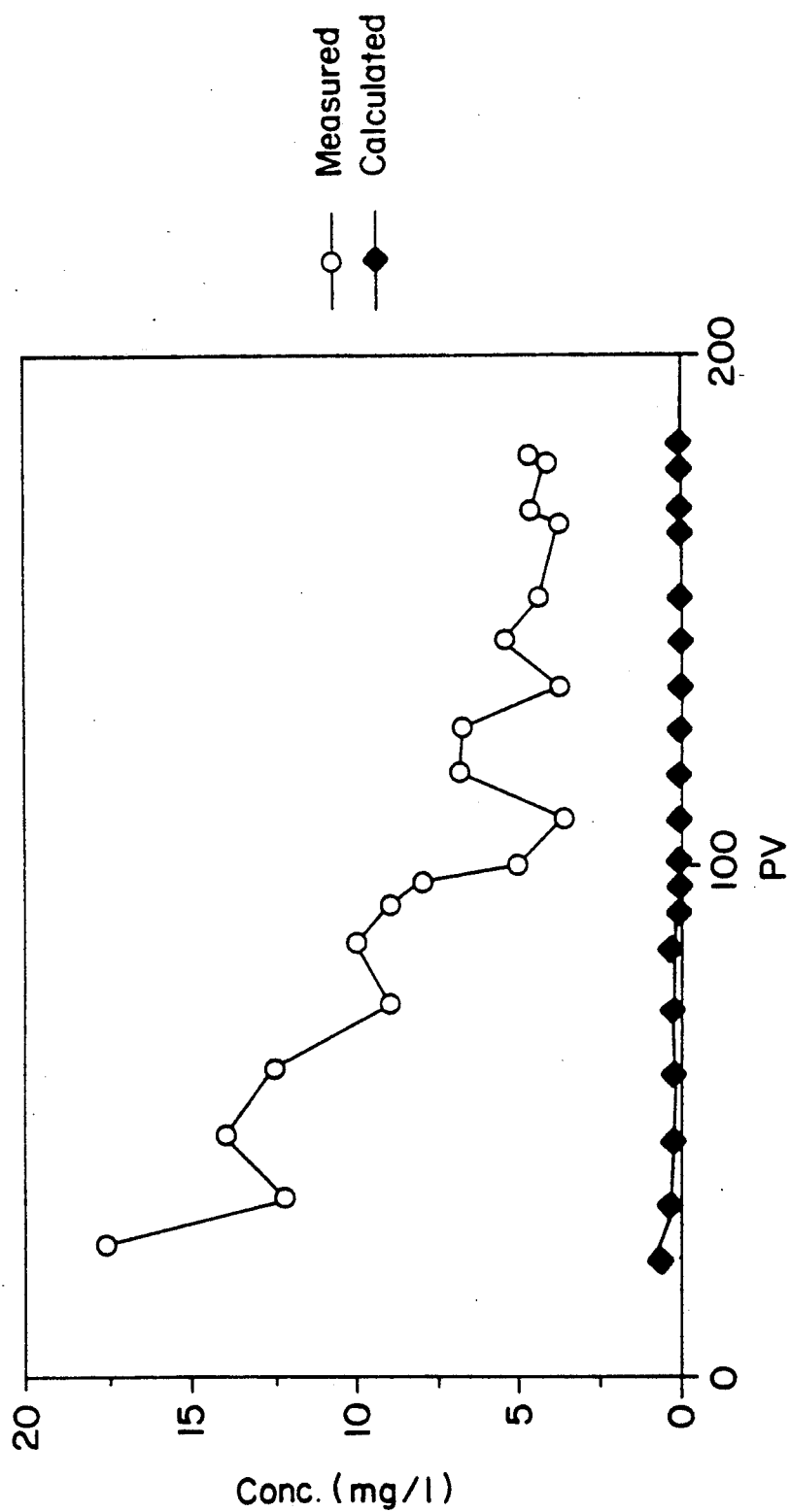
FIG. 23 is a graph comparing observed and calculated desorption curves.

A calculated desorption curve is shown in FIG. 23 together with the observed curve.

Figure 24:
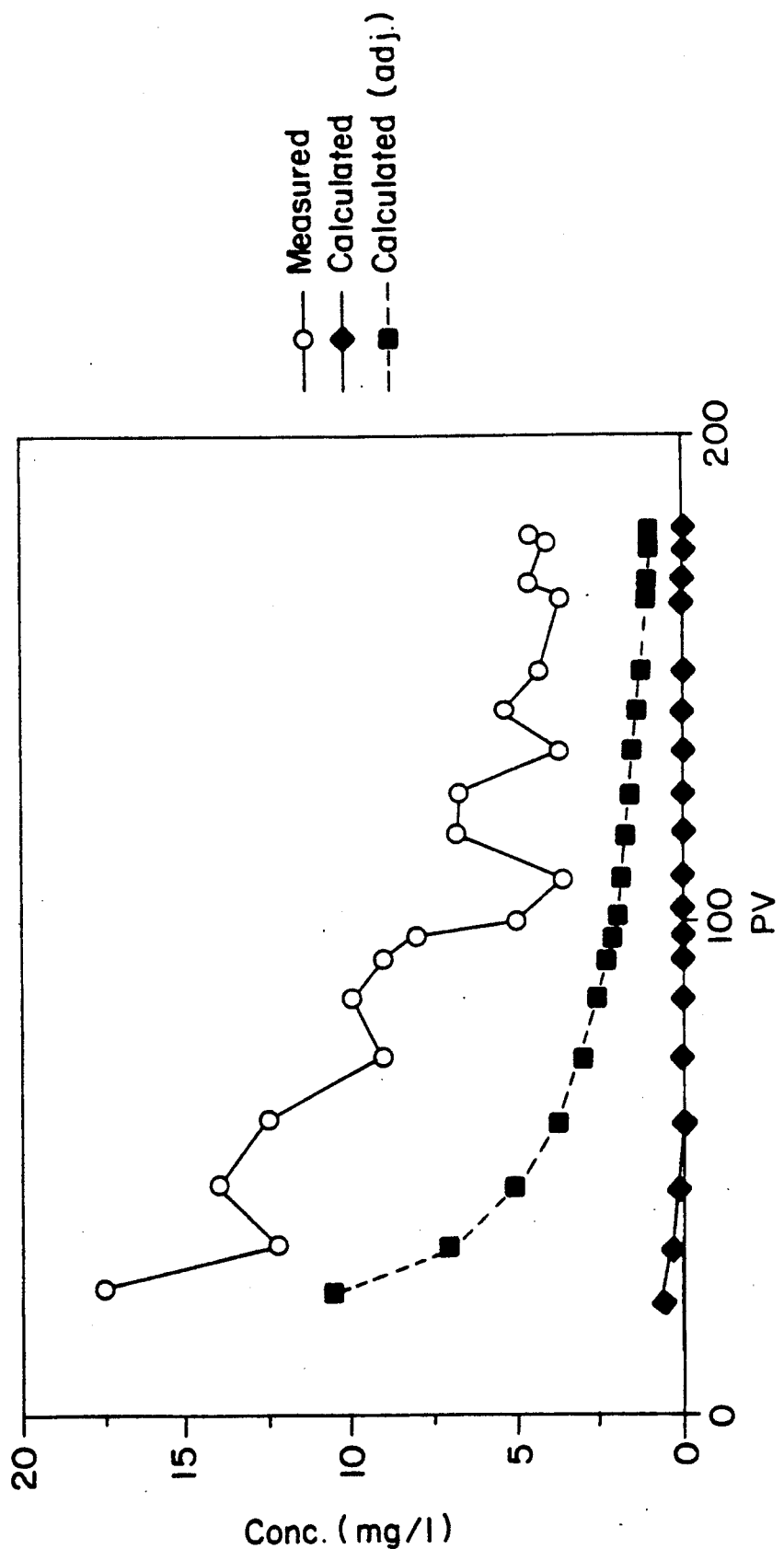
FIG. 24 is a graph similar to FIG. 23 showing an adjusted profile.

There is a difference in the calculated desorption profile based on the experimental results from the adsorption test, and the experimental desorption isotherm. Assuming the relative difference in the isotherms to be equal, a different calculated desorption profile occurs. The adjusted profile is shown in FIG. 24 together with the experimentally observed and first calculated desorption profile plotted in FIG. 23.

Implications for Inhibitor Squeezes

Injection of an inhibitor slug will normally be followed by a postflush in order to overflush the injected inhibitor. This would cause the inhibitor slug to be diluted and so its concentration would be decreased. This dilution would take place in the trailing end of the slug. If the postflush is a calcium solution, a precipitation is likely to occur.

It might also be that adsorption of the inhibitor takes place at the leading edge of the slug. A presqueeze with calcium would therefore increase the adsorption. Assuming no dilution at the leading edge of the slug, no precipitation will occur due to this effect. Temperature can however play an important role.

It is not inevitable that all of the dilution takes place at the trailing edge. Since the flow around the well is radial, the front of the slug is continuously spread over a larger volume. It is to be expected that due to this spreading of the injected volume, dilution takes place at the leading edge of the slug. Thus, precipitation may occur at the front of the slug if a calcium preflush has been injected.

The effect of dilution is difficult to demonstrate in the laboratory. However it is believed that dilution will play a major role in precipitating the inhibitor during injection. Important factors are pre- and postflushes, and diffusion during the shut-in period in the field.

Adding 2000 mg/l calcium to the solution can increase the adsorption of phosphinopolycarboxylic acid. This may also lead to increased irreversible adsorption. If so, less phosphinopolycarboxylic acid is then available for desorption, and the squeeze time may be shortened as compared to when no calcium is present. At 3000 mg/l calcium, phosphinopolycarboxylic acid will precipitate. The precipitated calcium phosphinopolycarboxylate salt will redissolve when the solution concentration becomes low enough. This means that soluble phosphinopolycarboxylate will be available to the solution over a long time period compared to when only adsorption is involved.

Injection of pre- and post-flushes with calcium have mainly been performed in order to increase the adsorption of the inhibitor. If the $Ca^{2+}$ is mixed with the phosphinopolycarboxylic acid in advance of injection of the inhibitor, the lifetime will be prolonged.

The last test (Run 12) was run for a considerable time to observe if the desorption profile continued to have an exponential form. It can be seen from FIG. 15 that from approximately 200 PV, the desorption curve flattens and becomes almost constant. An exponential form seems not to be a valid assumption. This could be interpreted as the end of the non-diffusion controlled desorption period and the start of a diffusion controlled desorption. The cores have a high content of kaolinite with a very high density of dead end pores. During the squeeze injection period, a high diffusion rate into the pores is achieved due to the large concentration gradient. The diffusion takes place over a time period of 16 hours. After a few pore volumes (2-3 hours) following production start, the inhibitor concentration in the open pores in the core is so low that diffusion from the dead end pores begins, but now at a much reduced rate due to the lower concentration gradient. Long time adsorption tests have indicated that up to 30% of the pore space is composed of dead end pores. This means that much of the injected inhibitor is located in these pores and will leach out over a long time period.

When only adsorption is considered, the value of S in equation (3) can not be greater than $-1$. In Runs 9 and 11 in test 2, the values of S are calculated to be $-0.68$ and $-0.84$ (table 5). In test No. 9, $Ca^{2+}$ was mixed with the phosphinopolycarboxylic acid before injecting it and Run 11 was a resqueeze. The most likely explanation for this behaviour is that the system is not a pure adsorption system, but that some precipitation of the inhibitor has taken place.

Inhibitor Recovery

The recovery of the inhibitor (table 10) shows that there is much material left in the core at the end of the test. The values give an indication of the amount of trapped inhibitor since integration may be inexact due to the limited number of observations in the early stages of the desorption experiments. The effluent concentrations in the resqueeze (Run 11) are considerably higher than in the first squeeze (test 10). This may be due to the fact that little of the injected inhibitor in the resqueeze is trapped in the dead-end pores because these are already filled with inhibitor from the first squeeze.

It may be concluded that an extended squeeze life is obtained by adding calcium in a sandstone core. It can also be deduced that the polymer squeezes last longer than the phosphonate squeezes, with and without calcium.

It can be seen that the last part of the desorption curve relies heavily on diffusion of the inhibitor from dead end pores. Dead end pores in rocks provide other means of extending squeeze lifetime via longer soak times with high inhibitor concentrations. Dilution and diffusion during injection, and shut-in together with temperature tolerance are important factors in regulating the inhibitor's reaction.

Obviously, numerous modifications and variations of the present invention are possible in the light of the above teachings. It is therefore to be understood that within the scope of the appended claims, the invention may be practiced otherwise than as specifically described herein.

TABLE 1

| Slug design for test set 1. | | | |
|---|---|---|---|
| 0.50 PV 10% NaCl | | | |
| 0.50 PV 5% inhibitor + x mg/l Ca. | | | |
| 0.25 PV 10% NaCl | | | |
| 0.25 PV y mg/l Ca | | | |
| 16 hours at 50° C. | | | |
| 0.50 PV x mg/l Ca in reversed flow direction | | | |
| formation water. | | | |
| Run | Inhibitor | x (mg/l) | y (mg/l) |
| 1 | phosphonate | 0 | 0 |
| 2, 3 | phosphonate | 1000 | 2500 |
| 3 | phosphonate | 1000 | 2500 |
| 4 | phosphinopolycarboxylic acid | 0 | 0 |
| 5 | phosphinopolycarboxylic acid | 1500 | 1500 |

TABLE 2

Data for the cores used in test set 1.

| Run | Pore volume (ml) | Porosity (%) | Sampling depth (m) |
|---|---|---|---|
| 1 | 29 | 27.1 | 1828.68 |
| 2, 3 | 13 | 19.6 | 1897.62 |
| 4 | 13 | 9.7 | 1901.65 |
| 5 | 13 | 9.7 | 1901.65 |

TABLE 3

Slug design for the different tests in test set 2.

| Run | Slug design |
|---|---|
| 6 | 0.5 PV of phosphinopolycarbolxylic acid, 3% active |
| 7 | 1 PV of 2000 mg/l Ca/100 mg/l phosphino-polycarboxylic acid, diluted in pH 5.5 seawater (SW)<br>0.1 PV of 100 mg/l S-29, diluted in pH 8 formation water (FW)<br>0.5 PV of phosphinopolycarboxylic acid, 3% active. |
| 8 | 0.5 PV of S-29 3% active, 2000 mg/l Ca added to the inhibitor solution. |
| 9 | 0.5 PV of phosphinopolycarboxylic acid, 3% active. 3000 mg/l Ca added to the phosphinopolycarboxylic acid solution. |
| 10, 11 | 1 PV of 2000 mg/l Ca 100 mg/l phosphino-polycarboxylic acid, diluted in pH 5.5 SW.<br>0.1 PV of 100 mg/l S-29, diluted in pH 8 SW.<br>0.5 PV of phosphinopolycarboxylic acid, 3% active.<br>0.1 PV of 100 mg/l S-29, diluted in pH 8 SW.<br>0.2 PV of 2000 mg/l Ca/100 mg/l S-29, diluted in pH 5.5 SW. |
| 12 | As test 6 |
| 13 | 1 PV of 2000 mg/l Ca, diluted in pH 5.5 SW<br>0.1 PV of pH 8 SW<br>0.5 PV of DETAPMP, 3% active. |

TABLE 4

Data for the cores used in test set 2.

| Run | Pore volume (ml) | Porosity (%) | Sampling depth (m) |
|---|---|---|---|
| 6 | 28.5 | 25.3 | 1905.73 |
| 7 | 43.5 | 35.3 | 1910.96 |
| 8 | 37.0 | 34.1 | 1910.91 |
| 9 | 34.0 | 32.4 | 1930.19 |
| 10/11 | 40.7 | 32.1 | 1919.18 |
| 12 | 37.5 | 30.5 | 1919.23 |
| 13 | 39.5 | 34.1 | 1913.85 |

TABLE 5

Efficiency data for the phosphinopolycarboxylic acid.

| Concentration (mg/l) | Temp. (C.) | pH | Efficiency (%) |
|---|---|---|---|
| 2.5 | 75 | 5.3 | 90 |
| 10.5 | 75 | 5.3 | >95 |

TABLE 6

Efficiency data for the phosphonate,
pH 4, 100 (C.) pH 8, 100 (C.)

| Concentration (mg/l) | Efficiency (%) | Efficiency (%) |
|---|---|---|
| 5 | 13 | |
| 10 | 66 | |
| 12 | 90 | 52 |
| 25 | >90 | 65 |

TABLE 7

Formation Water

| Constituents | mg/l |
|---|---|
| $Na^+$ | 14570 |
| $K^+$ | 330 |
| $Ca^{++}$ | 1040 |
| $Mg^{++}$ | 305 |
| $Sr^{++}$ | 260 |
| $Ba^{++}$ | 50 |
| SUM OF CATIONS | 16555 |
| $Cl^-$ | 25600 |
| $HCO_3^-$ | 400 |
| $CO_3^=$ | 0 |
| $SO_4^=$ | 0 |
| SUM OF ANIONS | 26000 |

Total dissolved solids (calculated) = 42555 mg/l
d = 1.029  pH = 5.5  ionic strength = 0.77.

TABLE 8

Sea Water

| Constituents | mg/l |
|---|---|
| $Na^+$ | 12100 |
| $K^+$ | 410 |
| $Ca^{++}$ | 450 |
| $Mg^{++}$ | 1130 |
| $Sr^{++}$ | 9 |
| $Ba^{++}$ | 0 |
| $Fe^{2+}$ | 1 |
| $B^{3+}$ | 4.6 |
| SUM OF CATIONS | 14104.6 |
| $Cl^-$ | 20950 |
| $HCO_3^-$ | 170 |
| $CO_3^=$ | 0 |
| $SO_4^=$ | 2400 |
| SUM OF ANIONS | 23520 |

Total dissolved solids (calculated) = 37.625 mg/l
d = 1.026  pH = 7.9  ionic strength = 0.73.

TABLE 9

Squeeze lifetime for the phosphinopolycarboxylic
acid and phosphonate based on the results from
test set 1, using 90% efficiency as a criteria
or 5 mg/l as a criteria.

| | Squeeze lifetime (PV) | |
|---|---|---|
| Run | 90% | 5 mg/l |
| 1 | 20 | 26 |
| 2 | 35 | 62 |
| 3 | 44 | 69 |
| 4 | 97 | 97 |
| 5 | 97 | 97 |

TABLE 10

Values for K and S from test set 2.

| Run | K | S |
|---|---|---|
| 6 | 646 | −0.99 |
| 7 | 871 | −1.22 |
| 8 | 7943 | −1.54 |
| 9 | 126 | −0.68 |
| 10 | 363 | −1.01 |
| 11 | 178 | −0.84 |
| 12 | 1122 | −1.14 |
| 13* | | |

*It was not possible to fit the observed data to equation (2). This is also obvious from FIG. 14.

TABLE 11

Squeeze lifetime for the phosphinopolycarboxylic acid based on the results from test set 2, at 1, 2 and 5 mg/l.

| | Squeeze lifetime (PV) | | |
|---|---|---|---|
| Run | 1 mg/l | 2 mg/l | 5 mg/l |
| 6 | 690 | 342 | 136 |
| 7 | 256 | 146 | 69 |
| 8 | 340 | 217 | 120 |
| 9 | 1227 | 443 | 115 |
| 10 | 342 | 172 | 70 |
| 11 | 555 | 238 | 78 |
| 12 | 474 | 258 | 115 |

TABLE 12

Recovery of the scale inhibitor at different effluent concentrations.

| | Recovery (%) | | |
|---|---|---|---|
| Run | 50 mg/l | 5 mg/l | at end of test |
| 6 | 11.6 | 19.5 | 22.1 |
| 7 | 11.7 | 15.7 | 22.0 |
| 8 | 11.9 | 19.7 | 19.7 |
| 9 | 9.8 | 16.3 | 20.1 |
| 10 | 4.5 | 9.9 | 19.7 |
| 11 | 22.4 | 25.7 | 31.6 |
| 12 | 12.6 | 24.5 | 33.3 |
| 13 | 34.4 | 34.4 | 34.4 |

We claim:

1. A method of treating a fluid-bearing rock formation, comprising a material having ion-exchange sites at a surface thereof, to inhibit deposition of scale, said method comprising the steps of: treating said rock formation with a source of divalent alkali earth metal cations to displace a proportion of any cations present at said ion-exchange sites in said surface area of said material of said rock formation, and subsequently treating said rock formation with an inhibitor to inhibit deposition of scale.

2. A method according to claim 1, wherein said alkali earth metal is added in the form of an aqueous solution of a salt of said metal.

3. A method according to claim 2, wherein said salt is a chloride.

4. A method according to claim 2, wherein said metal is calcium.

5. A method according to claim 2, wherein said salt is calcium chloride.

6. A method according to claim 1, wherein said rock formation is treated with said source of divalent alkali earth metal cations sufficiently to saturate the ion-exchange sites.

7. A method according to claim 1, wherein said source of divalent alkali earth metal cations is a treatment liquid comprising a natural water source which has been de-aerated and rendered biologically inert and to which calcium chloride has been added.

8. A method according to claim 1, wherein said inhibitor is an acid inhibitor.

9. A method according to claim 8, wherein said inhibitor is selected from the group consisting of phosphonates phosphinopolycarboxylic acids, polyacrylic acids, maleic acid derivatives and co-polymerised maleic acid anhydride.

10. A method according to claim 9, wherein said inhibitor is selected from the group consisting of phosphonates and phosphinopolycarboxylic acid.

11. A method according to claim 8, wherein the pH of said inhibitor is maintained at a value of between 5 and 6 by means of a buffer system.

12. A method according to claim 1, further comprising the step of allowing said inhibitor to soak-in for 12 to 48 hours after said rock formation has been treated with said inhibitor.

13. A method according to claim 1, further comprising the step of pre-conditioning said material of said rock formation in the near well bore area to facilitate the inhibitor treatment prior to said cation and inhibitor treatments.

14. A method according to claim 13, wherein said pre-conditioning step comprises the step of pre-flushing an aqueous solution of a surface-active agent.

15. A method according to claim 14, wherein said pre-conditioning step includes the step of injecting a spacer of a saline solution together with other salts, following said pre-flush.

* * * * *